United States Patent
Karabinis

(10) Patent No.: US 7,444,170 B2
(45) Date of Patent: Oct. 28, 2008

(54) CO-CHANNEL WIRELESS COMMUNICATION METHODS AND SYSTEMS USING NONSYMMETRICAL ALPHABETS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 762 days.

(21) Appl. No.: 10/795,875

(22) Filed: Mar. 8, 2004

(65) Prior Publication Data

US 2004/0192395 A1 Sep. 30, 2004

Related U.S. Application Data

(60) Provisional application No. 60/457,043, filed on Mar. 24, 2003, provisional application No. 60/457,118, filed on Mar. 24, 2003, provisional application No. 60/473,959, filed on May 28, 2003, provisional application No. 60/477,522, filed on Jun. 11, 2003.

(51) Int. Cl.
*H04Q 7/30* (2006.01)
(52) U.S. Cl. .................... 455/562.1; 455/561
(58) Field of Classification Search .......... 455/562.1, 455/450, 451, 453, 452.1, 452.2
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |

(Continued)

FOREIGN PATENT DOCUMENTS

EP 0 506 255 A2 9/1992

(Continued)

OTHER PUBLICATIONS

Andrews et al., *Tripling the Capacity of Wireless Communications Using Electromagnetic Polarization*, Nature, vol. 409, Jan. 18, 2001, pp. 316-318.

(Continued)

*Primary Examiner*—Philip J Sobutka
(74) *Attorney, Agent, or Firm*—Myers Bigel Sibley & Sajovec

(57) ABSTRACT

Wireless communications are transmitted from at least two radioterminals to a base station co-channel over a return link using a return link alphabet. Wireless communications are also transmitted from the base station to the at least two radioterminals over a forward link using a forward link alphabet that has more symbols than the return link alphabet. The co-channel signals are deciphered at the receiver, while the radioterminals can use a smaller return link alphabet, which can reduce the power dissipation at the radioterminals.

98 Claims, 13 Drawing Sheets

U.S. PATENT DOCUMENTS

| | | |
|---|---|---|
| 5,724,666 A | 3/1998 | Dent |
| 5,754,961 A * | 5/1998 | Serizawa et al. ............ 455/517 |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,872,544 A | 2/1999 | Schay |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,377,817 B1 * | 4/2002 | Hakaste et al. ............ 455/553.1 |
| 6,411,824 B1 * | 6/2002 | Eidson ................ 455/562.1 X |
| 6,418,147 B1 | 7/2002 | Wiedeman |
| 6,418,316 B2 | 7/2002 | Hildebrand et al. |
| 6,445,926 B1 | 9/2002 | Boch et al. |
| 6,449,461 B1 | 9/2002 | Otten |
| 6,522,865 B1 | 2/2003 | Otten |
| 6,526,278 B1 | 2/2003 | Hanson et al. |
| 6,549,759 B2 | 4/2003 | Arviv et al. |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,510 B2 | 8/2004 | Larsen |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0045307 A1 * | 3/2003 | Arviv et al. .................. 455/464 |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0266339 A1 * | 12/2004 | Larsson ........................ 455/7 |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040659 A1 | 2/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Beach et al., *Capacity and Service Extension for Future Wireless Networks Using Adaptive Antennas,* Antennas and Propagation, Conference Publication No. 407, Apr. 4-7, 1995, pp. 125-129.

Cusani et al., *A Simple Polarization-Recovery Algorithm for Dual-Polarized Cellular Mobile-Radio Systems in Time-Variant Faded Environments,* IEEE Transactions on Vehicular Technology, vol. 49, No. 1, Jan. 2000, pp. 220-228.

Czylwik, *Downlink Beamforming for Mobile Radio Systems With Frequency Division Duplex*, The 11th IEEE International Symposium on Personal, Indoor and Mobile Radio Communications, vol. 1, Sep. 18-21, 2000, pp. 72-76.

Gardner et al., *Making the Most Out of Spectral Redundancy in GSM: Cheap CCI Suppression*, IEEE Conference Record of the Thirty-Fifth Asilomar Conference on Signals, Systems and Computers, vol. 1, Nov. 4-7, 2001 pp. 883-889.

Gerlach, *Cellular CDMA Downlink Beamforming in Multipath Environments*, 4th CDMA International Conference and Exhibition, The Realization of IMT-2000, vol. 2, 1999, pp. 270-276.

Hafeez et al., *Capacity and Quality Enhancement for ANSI-136 Downlink Using Interference Cancellation and Beamforming*, IEEE 52nd Vehicular Technology Conference, vol. 5, Sep. 24-28, 2000, pp. 2414-2421.

Jeng et al., *Experimental Evaluation of Smart Antenna System Performance for Wireless Communications*, IEEE Transactions on Antennas and Propagation, vol. 46, No. 6, Jun. 1998, pp. 749-757.

Lehmann et al., *Evaluations of Link-Level Performance Improvements by Using Smart Antennas for the TD-CDMA Based UTRA TDD Mobile Radio Systems*, 52nd IEEE Vehicular Technology Conference, vol. 3, Sep. 24-28, 2000, pp. 1328-1332.

Li et al., *Spatial Multiuser Access With MIMO Smart Antennas for OFDM Systems*, IEEE 54th Vehicular Technology Conference, vol. 3, Oct. 7-11, 2001, pp. 1553-1557.

Liu et al., *Smart Antennas in Wireless Systems: Uplink Multiuser Blind Channel and Sequence Detection*, IEEE Transactions on Communications, vol. 45, No. 2, Feb. 1997, pp. 187-199.

Marzetta et al., *Capacity of a Mobile Multiple-Antenna Communication Link in Rayleigh Flat Fading*, IEEE Transactions on Information Theory, vol. 45, No. 1, Jan. 1999, pp. 139-157.

Miller et al., *Estimation of Co-Channel Signals With Linear Complexity*, IEEE Transactions on Communications, vol. 49, No. 11, Nov. 2001, pp. 1997-2005.

Mohamed et al., *A Combined Antenna Array and Multi-User Detection DS-CDMA Receiver in Single-Path and Multi-Path Fading Channels*, Wireless Personal Communications, vol. 20, 2002, pp. 251-265.

Mohamed et al., *A Low-Complexity Combined Antenna Array and Interference Cancellation DS-CDMA Receiver in Multipath Fading Channels*, IEEE Journal on Selected Areas in Communications, vol. 20, No. 2, Feb. 2002, pp. 248-256.

Monsen, *MMSE Equalization of Interference on Fading Diversion Channels*, IEEE Transactions on Communications, vol. Com-32, No. 1, Jan. 1984, pp. 5-12.

Monsen, *Multiple-Access Capacity in Mobile User Satellite Systems*, IEEE Journal on Selected Areas in Communications, vol. 13, No. 2, Feb. 1995, pp. 222-231.

Naguib et al., *Applications of Space-Time Block Codes and Interference Suppression for High Capacity and High Data Rate Wireless Systems*, Conference Record of the Thirty-Second Asilomar Conference on Signals, Systems & Computers, vol. 2, Nov. 1-4, 1998, pp. 1803-1810.

Naguib et al., *Space-Time Block Codes and Interference Suppression for High Capacity Wireless Systems*, Conference Record of the Thirty-Section Asilomar Conference on Signals, Systems and Computers, vol. 2, Nov. 1-4, 1998, pp. 1803-1810.

Nishimori et al., *Automatic Calibration Method Using Transmitting Signals of an Adaptive Array for TDD Systems*, IEEE Transactions on Vehicular Technology, vol. 50, No. 6, Nov. 2001, pp. 1636-1640.

Papadopoulos et al., *Reduction of Mixed Cochannel Interference in Microcellular Shared Time-Division (STDD) Systems*, IEEE Transactions on Vehicular Technology, vol. 47, No. 3, Aug. 1998, pp. 842-855.

Rapajic, *Information Capacity of a Multipath Mobile Communication Channel With Large Number of Receiving Antennas*, IEEE ITW2001, Sep. 2-7, 2001, pp. 104-106.

Razavilar et al., *Software Radio Architecture With Smart Antennas: A Tutorial On Algorithms and Complexity*, IEEE Journal on Selected Areas in Communications, vol. 17, No. 4, Apr. 1999, pp. 662-676.

Suthaharan et al., *Space-Time Coded MIMO-OFDM for High Capacity and High Data-Rate Wireless Communication Over Frequency Selective Fading Channels*, IEEE 4th International Workshop Mobile and Wireless Communications Network, 2002, Sep. 9-11, 2002, pp. 424-428.

Wells, *Increasing the Capacity of GSM Cellular Radio Using Adaptive Antennas*, IEE Proc.-Commun., vol. 143, No. 5, Oct. 1996, pp. 304-310.

Wolniansky et al., *V-BLAST: An Architecture for Realizing Very High Data Rates Over the Rich-Scattering Wireless Channel*, Invited paper, Proc. ISSSE-98, Pisa, Italy, Sep. 29, 1998, pp. 295-300.

Wong et al., *Adaptive Antennas at the Mobile and Base Stations in an OFDM/TDMA System*, IEEE Transactions on Communications, vol. 49, No. 1, Jan. 2001, pp. 195-208.

Wong et al., *Performance Enhancement of Multiuser MIMO Wireless Communication Systems*, IEEE Transactions on Communications, vol. 50, No. 12, Dec. 2002, pp. 1960-1970.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

International Search Report and Written Opinion for PCT/US04/08880; date of mailing Sep. 6, 2007.

* cited by examiner

CO-CHANNEL WIRELESS COMMUNICATION METHODS AND SYSTEMS USING NONSYMMETRICAL ALPHABETS

CROSS-REFERENCE TO PROVISIONAL APPLICATIONS

This application claims the benefit of Provisional Application Ser. No. 60/457,043, entitled Satellite Assisted Push-To-Send Radiotelephone Systems and Methods, filed Mar. 24, 2003; Provisional Application Ser. No. 60/457,118, entitled Radio Frequency Communication Systems and Methods That Use Polarization Orthogonality to Double Channel Capacity, filed Mar. 24, 2003; Provisional Application Ser. No. 60/473,959, entitled Systems and Methods That Enable Co-Channel Communications With a Base Station of a Plurality of Radioterminals, filed May 28, 2003; and Provisional Application Ser. No. 60/477,522, entitled Satellite Assisted Push-To-Send Radioterminal Systems, Methods and Protocols, filed Jun. 11, 2003, all of which are assigned to the assignee of the present invention, the disclosures of all of which are hereby incorporated herein by reference in their entirety as if set forth fully herein.

FIELD OF THE INVENTION

This invention relates to wireless communications methods and systems, and more particularly to wireless communication systems and methods that can communicate co-channel.

BACKGROUND OF THE INVENTION

Polarization diversity receiving systems and methods are well known in wireless communications. For example, a wireless terminal may transmit a linearly-polarized signal that may be received by orthogonally polarized antennas (e.g., horizontal and vertical polarization) at a base station (terrestrial or space-based) to thereby separately receive orthogonally polarized portions of the transmitted signal. The orthogonally polarized portions may be combined to effectively increase link robustness, since many channel degradations such as fading, are largely uncorrelated when comparing antennas of orthogonal polarizations. See for example, U.S. Pat. No. 6,526,278 to Hanson et al. entitled Mobile Satellite Communication System Utilizing Polarization Diversity Combining; U.S. Pat. No. 5,724,666 to Dent entitled Polarization Diversity Phased Array Cellular Base Station and Associated Methods; U.S. Pat. No. 6,418,316 to Hildebrand et al. entitled Increasing Channel Capacity of Wireless Local Loop via Polarization Diversity Antenna Distribution Scheme; and U.S. Pat. No. 6,445,926 to Boch et al. entitled Use of Sectorized Polarization Diversity as a Means of Increasing Capacity in Cellular Wireless Systems.

Other systems and methods that use polarization effects in wireless communications are described in the following publications: Andrews et al., *Tripling the Capacity of Wireless Communications Using Electromagnetic Polarization*, Nature, Vol. 409, Jan. 18, 2001, pp. 316-318; Wolniansky et al., *V-BLAST: An Architecture for Realizing Very High Data Rates Over the Rich-Scattering Wireless Channel*, Invited paper, Proc. ISSSE-98, Pisa, Italy, Sep. 29, 1998, pp. 295-300; and Cusani et al., *A Simple Polarization-Recovery Algorithm for Dual-Polarized Cellular Mobile-Radio Systems in Time-Variant Faded Environments*, IEEE Transactions in Vehicular Technology, Vol. 49, No. 1, January 2000, pp. 220-228.

It is also known to use diversity concepts to increase the capacity of wireless communications. See, for example, the following publications: Miller et al., *Estimation of Co-Channel Signals With Linear Complexity*, IEEE Transactions on Communications, Vol. 49, No. 11, November 2001, pp. 1997-2005; and Wong et al., *Performance Enhancement of Multiuser MIMO Wireless Communications Systems*, IEEE Transactions on Communications, Vol. 50, No. 12, December 2002, pp. 1960-1970.

SUMMARY OF THE INVENTION

Some embodiments of the present invention transmit wireless communications from at least two radioterminals to a base station co-channel over a return link using a return link alphabet, and transmit wireless communications from the base station to the at least two radioterminals over a forward link using a forward link alphabet that has more symbols than the return link alphabet. As used herein, the term "co-channel" indicates signals that overlap in time and space, and that use the same carrier frequency, the same time slot if the signals are Time Division Multiple Access (TDMA) signals, and the same spreading code if the signals are Code Division Multiple Access (CDMA) signals, such that the two signals collide at a receiver. Embodiments of the present invention can allow the co-channel signals to be decoded or deciphered at the receiver, and can allow the radioterminals to use a smaller return link alphabet which can reduce the power dissipation at the radioterminals.

In some embodiments of the present invention, the wireless communications are transmitted from the base station to the radioterminals non-co-channel over the forward link using the forward link alphabet that has more symbols than the return link alphabet. In yet other embodiments, co-channel transmissions may be used. In some embodiments, wireless communications are transmitted from the at least two radioterminals to at least one antenna at the base station co-channel over a return link using a return link alphabet. In other embodiments, these transmissions are made to at least one multiple-polarized antenna at the base station. In yet other embodiments, these transmissions are made to a plurality of multiple-polarized antennas at the base station. In still other embodiments, these transmissions are made to a plurality of multiple-polarized antennas in a single sector of the base station. In some embodiments, the wireless communications are transmitted to the plurality of multiple-polarized antennas in a sector if the at least two radioterminals are separated by more than a predetermined distance. In other embodiments, these transmissions are made to at least one multiple-polarized antenna in at least two sectors of the base station. In yet other embodiments, these transmissions are made to at least one multiple-polarized antenna at a first base station and at least one multiple-polarized antenna at a second base station. In still other embodiments, these transmissions are made from a single linearly-polarized antenna at each of the at least two radioterminals.

Other embodiments of the present invention transmit wireless communications from at least two radioterminals to a base station over a return link using a return alphabet and transmit wireless communications from the base station to the at least two radioterminals co-channel over a forward link using a forward link alphabet that has more symbols than the return link alphabet. In other embodiments, as was described above, the transmission from the radioterminals to the base station may be non-co-channel or co-channel. Moreover, the wireless communications may be transmitted from the base station to at least one antenna at each of the at least two radioterminals, to at least one multiple-polarized antenna at each of the at least two radioterminals and/or to a plurality of multiple-polarized antennas at each of the at least two radioterminals, co-channel over a forward link using a forward link alphabet that has more symbols than the return link alphabet, as was described above. Transmission from the base station may use at least one antenna, at least one linearly-polarized antenna, at least two linearly-polarized antennas, at least two linearly-polarized antennas in a sector, at least one linearly-polarized antenna in at least two sectors and/or at least one linearly-polarized antenna at two or more base stations, as was described above.

In other embodiments of the present invention, wireless communications are received from a base station at a first radioterminal and at least one second radioterminal that is proximate the first radioterminal over a forward link, co-channel. The wireless communications are relayed from the at least one second radioterminal to the first radioterminal over a short-range wireless link. The wireless communications that are relayed to the first radioterminal from the at least one second radioterminal over the short-range wireless link are used to process the wireless communications that are received from the base station at the first radioterminal. Moreover, these embodiments may be combined with any of the embodiments that were described above.

Still other embodiments of the present invention bidirectionally transmit wireless communications co-channel in time division duplex from at least two radioterminals to a base station over a return link using a return link alphabet, and from the base station to the at least two radioterminals over a forward link using a forward link alphabet that has more symbols than the return link alphabet. These embodiments also may be combined with any of the embodiments that were described above.

It will be understood by those having skill in the art that embodiments of the present invention were described above primarily with respect to method aspects. However, other embodiments of the present invention provide systems, base stations and radioterminals according to any of the embodiments that were described above.

DETAILED DESCRIPTION

Figure 1:
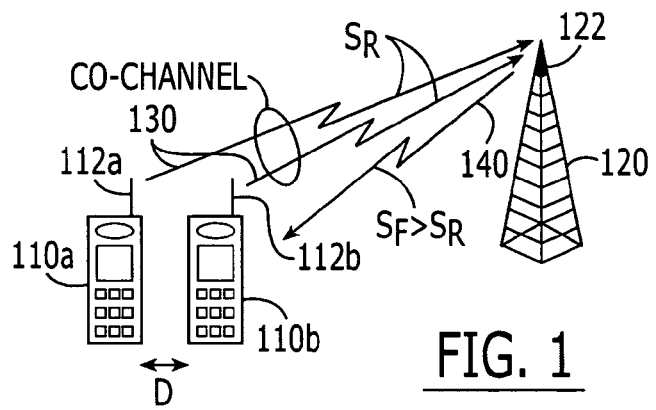
FIGS. 1-3 and 4A-4B are diagrams of co-channel wireless communications according to various embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Some embodiments of the present invention may arise from a recognition that it is possible to configure two physically distinct radioterminals to transmit to a base station, also referred to as a base transceiver station (BTS), co-channel, using the same return-link radio-channel resource(s) while still being able, at the BTS, to reliably demodulate and reconstruct (i.e., decode) the two data streams of the two physically distinct radioterminals. It is also possible to configure a BTS to transmit to two physically distinct radioterminals co-channel, over the same forward-link radio-channel resource(s), while each of the two distinct radioterminals is able to reliably demodulate and reconstruct the information intended for it. The two physically distinct radioterminals may thus communicate bi-directionally with a BTS, co-channel, in some embodiments, using no more channel resource(s) than a single radioterminal would use. The signal processing techniques that make this possible, according to some embodiments of the invention, can exploit the multipath scattering nature of the radiochannel and/or the multi-dimensional nature of space and its relationship to electromagnetic wave propagation. Moreover, embodiments of the invention can be extended to allow three or more physically distinct radioterminals to communicate co-channel with a BTS without using any more radiochannel resource(s) than a single radioterminal would.

Some embodiments of the present invention may also arise from a recognition that co-channel communications may be more beneficial for an infrastructure (base station) receiver than for a radioterminal receiver, because an infrastructure transmitter may not be power limited and may thus resort to a higher-alphabet modulation format (i.e. 8-PSK, 16-QAM, 64-QAM, etc.) to increase channel capacity on a forward link. In contrast, a radioterminal's transmitter may be power limited and may thus be constrained to lower-alphabet modulation formats (i.e. QPSK, GMSK, etc.). Thus, the ability of two or more radioterminals to send information to an infrastructure element (base station) co-channel may be used advantageously to increase channel capacity on the return link(s). According to some embodiments, therefore, base stations and radioterminals may be configured to utilize different modulation alphabets on forward and return links with a return link alphabet having a smaller number of distinct states (symbols) than a forward link alphabet, and with at least some infrastructure (base station) receivers of the system configured for co-channel communications, as will be described in further detail below.

FIG. 1 is a diagram of co-channel wireless communications using nonsymmetrical alphabets according to some embodiments of the present invention. As shown in FIG. 1, wireless communications are transmitted from at least two radioterminals 110a and 110b to a base station (BTS) 120 co-channel over a return link 130 using a return link alphabet having return link symbols $S_R$. As also shown in FIG. 1, wireless communications are transmitted from the base station 120 to the at least two radioterminals 110a and 110b over a forward link 140 using a forward link alphabet having forward link symbols $S_F$, wherein the forward link alphabet has more symbols than the return link alphabet. In other words, $S_F > S_R$. In some embodiments, the wireless communications are transmitted from the base station 120 to the at least two radioterminals 110a and 110b non-co-channel over the forward link 140 using the forward link alphabet that has more symbols $S_F$ than the return link alphabet $S_R$.

Still referring to FIG. 1, the wireless communications are transmitted from the at least two radioterminals 110a and 110b to at least one antenna 122 at the base station 120 co-channel over the return link 130 using the return link alphabet. In some embodiments, the at least one antenna 122 is at least one multiple-polarized antenna. In other embodiments, the at least one antenna 122 is a plurality of multiple-polarized antennas.

In still other embodiments, the base station 120 includes a plurality of sectors using sectorization techniques that are well known to those having skill in the art. In some embodiments, the at least one antenna 122 comprises a plurality of multiple-polarized antennas in a single sector of the base station, such that wireless communications are transmitted from the at least two radioterminals 110a and 110b to the plurality of multiple-polarized antennas in the single sector of the base station 120 co-channel over the return link 130 using the return link alphabet. In other embodiments, the wireless communications from the at least two radioterminals 110a and 110b are transmitted to a plurality of multiple-polarized antennas 122 in the sector of the base station 120 co-channel over the return link 130 using the return link alphabet if the at least two radioterminals are separated by more than a predetermined distance D. In still other embodiments, the wireless communications are transmitted from the at least two radioterminals 110a and 110b to at least one multiple-polarized antenna 122 in at least two sectors of the base station 120 co-channel over a return link using the return link alphabet.

Figure 2:
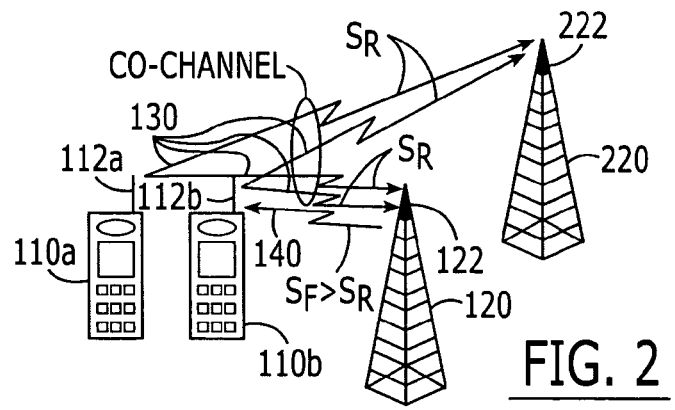

FIG. 2 is a diagram of co-channel wireless communications using nonsymmetrical alphabets according to other embodiments of the present invention. As shown in FIG. 2, the base station 120 is a first base station. Wireless communications are transmitted from at least two radioterminals 110a and 110b to at least one multiple-polarized antenna 122 at the first base station and at least one multiple-polarized antenna 222 at a second base station 220 co-channel over a return link 130 using a return link alphabet. In any of the embodiments of FIGS. 1 and/or 2, wireless communications may be transmitted from a single linearly-polarized antenna 112a, 112b at each of the at least two radioterminals 110a, 110b to the base station 120, 220 co-channel over the return link 130 using the return link alphabet.

Accordingly, some embodiments of FIGS. 1 and 2 allow co-channel transmissions from radioterminals to a base station using a small element alphabet in conjunction with non-co-channel transmissions from the base station to the radioterminals using a larger element alphabet. The number of antenna elements at the base station may be operative within a given sector of a base station, distributed over more than one sector of a base station and/or distributed over a plurality of base stations. As such, intra-sector co-channel return link communications may be provided, as well as inter-sector and inter-base station return link co-channel communications, to provide potentially improved capacity characteristics. Moreover, in some embodiments, intra-sector co-channel communications between two or more radioterminals and a base station may only be allowed in response to a distance D between the radioterminals. Since the system can know the position of the radioterminals, based on, for example, GPS or other techniques, radioterminals that are, for example, D meters or more apart may be allocated co-channel resources. Otherwise, non-co-channel resources may be allocated. The distance D may be selected so as to provide sufficient multipath differentiation from the signals that originate from the two radioterminals that are transmitting co-channel.

Figure 3:
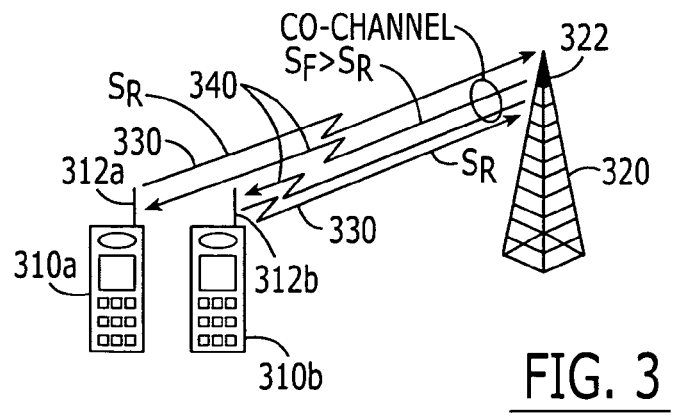

FIG. 3 is a diagram of co-channel wireless communications using nonsymmetrical alphabets according to still other embodiments of the present invention. As shown in FIG. 3, wireless communications are transmitted from at least two radioterminals 310a, 310b to a base station 320 over a return link 330 using a return link alphabet having return link symbols $S_R$. Wireless communications are also transmitted from the base station 320 to the at least two radioterminals 310a, 310b co-channel over a forward link 340 using a forward link alphabet having forward link symbols $S_F$, wherein the forward link alphabet has more symbols than the return link alphabet. In other words, $S_F > S_R$.

Embodiments of FIG. 3 may be employed where it is desirable to relay much more data to the radioterminals 310a, 310b from the base station 320 than to the base station 320 from the radioterminals 310a, 310b. This may be the case when the radioterminals may be receiving large files from the base station, whereas the radioterminals are only sending back mouse clicks and/or other small amounts of data. Embodiments of FIG. 3 use a larger element alphabet in conjunction with co-channel communications to serve two or more terminals, while the radioterminals use a smaller element alphabet and may communicate non-co-channel with the system. In other embodiments, wireless communications are transmitted from the at least two radioterminals 310a, 310b to the base station 320 co-channel over the return link 330 using the return link alphabet.

Still referring to FIG. 3, in some embodiments, the wireless communications are transmitted from the base station 320 to at least one antenna 312a, 312b at each of the at least two radioterminals co-channel over the forward link using the forward link alphabet that has more symbols than the return link alphabet. In some embodiments, the at least one antenna 312a, 312b comprises at least one multiple-polarized antenna. In other embodiments, the at least one antenna 312a, 312b comprises a plurality of multiple-polarized antennas. In other embodiments, the at least one antenna 322 at the base station 320 comprises at least one linearly-polarized antenna, at least two linearly-polarized antennas, at least two linearly-polarized antennas in a single sector and/or a linearly-polarized antenna in at least two sectors, as was described above in connection with the antennas 122 of FIG. 1. In still other embodiments, transmissions may occur to at least one linearly-polarized antenna at a first base station and at a second base station, as was described above in connection with FIG. 2.

Figure 4A:
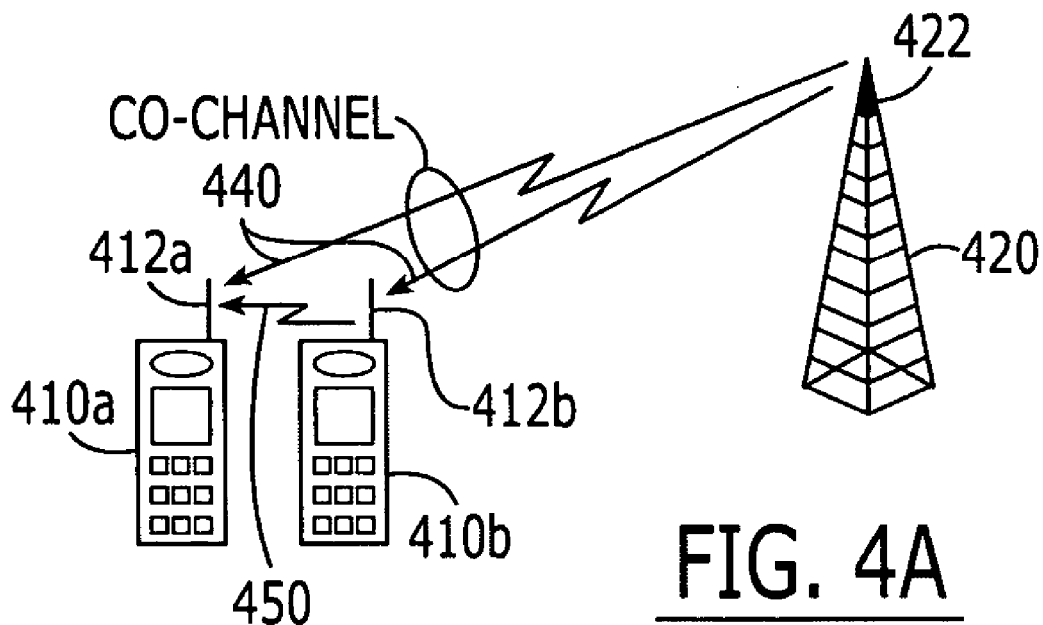

FIG. 4A is a diagram of co-channel wireless communications according to yet other embodiments of the present invention. As shown in FIG. 4A, wireless communications are received from a base station 420 at a first radioterminal 410a and at at least one second radioterminal 410b that is proximate the first radioterminal 410a, over a forward link 440, co-channel. The wireless communications from the at least one second radioterminal 410b are relayed to the first radioterminal 410a over a short-range wireless link 450. The short-range wireless link may be based on Bluetooth and/or other technologies such as 802.11, UWB, etc. The first radioterminal 410a uses the wireless communications that are relayed to the first radioterminal 410a from the at least one second radioterminal 410b over the short-range wireless link 450, to process the wireless communications that are received from a base station 420 at the first radioterminal 410a over the forward link 440.

Accordingly, in embodiments of FIG. 4A, the signals from one or more proximate radioterminals may be used to improve a quality measure such as a bit error rate, of the information that is being received from the base station 420. It will also be understood by those having skill in the art that embodiments of FIG. 4 need not use a forward link alphabet that has more symbols than a return link alphabet. However, in other embodiments of the invention, embodiments of FIG. 4 may be used with any of the embodiments of FIGS. 1-3, including the use of a forward link alphabet that has more symbols than a return link alphabet, co-channel communications from the radioterminals 410a, 410b to the base station 420, and antenna configurations for the base station 422 and for the radioterminal antennas 412a, 412b similar to those described in connection with FIGS. 1-3.

Figure 4B:
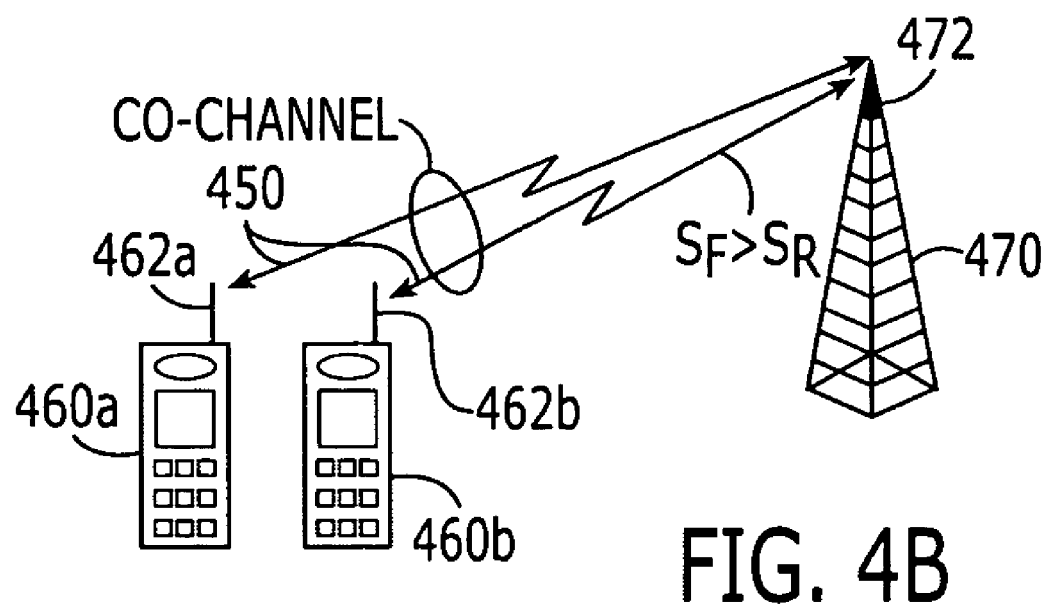

FIG. 4B is a diagram of co-channel wireless communications using nonsymmetrical alphabets according to still other embodiments of the present invention. Referring to FIG. 4B, wireless communications are bi-directionally transmitted co-channel in Time Division Duplex (TDD) 450. Time division duplex transmission is well known to those having skill in the art, and need not be described further herein. As shown in FIG. 4B, bidirectional transmission co-channel in time division duplex proceeds from at least two radioterminals 460a, 460b to a base station 470 over a return link using a return link alphabet, and from the base station 470 to the at least two radioterminals 460a, 460b over a forward link using a forward link alphabet that has more symbols than the return link alphabet. The antennas 462a, 462b of the first and second radioterminals 460a, 460b may be configured as was described in FIGS. 1-4A above. Moreover, the antenna or antennas 472 of the base station 470 may be embodied as was described above in any of FIGS. 1-4A.

Figure 5A:
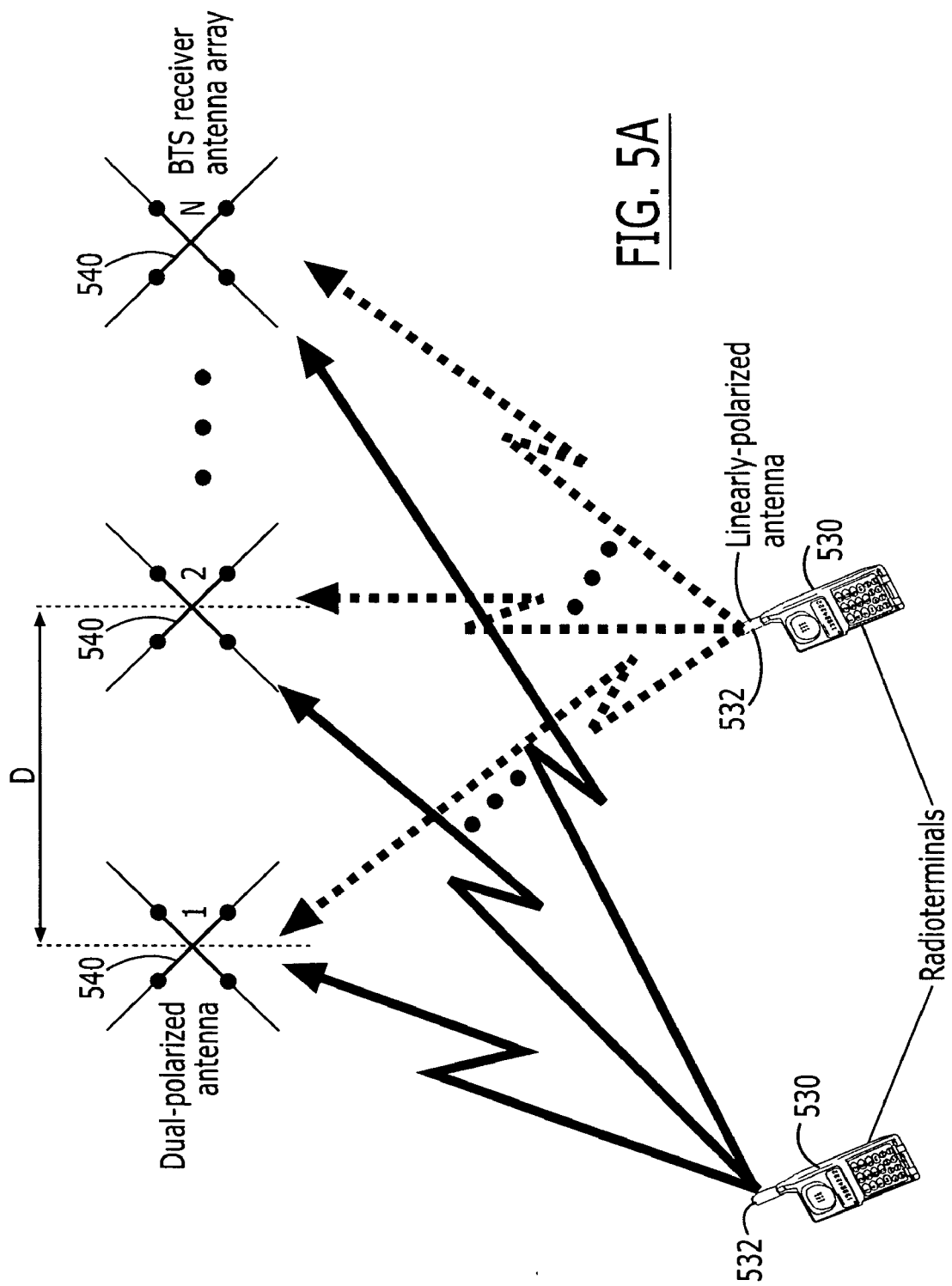
FIG. 5A is a diagram of radioterminal to base station communications according to embodiments of the present invention.
Figure 5B:
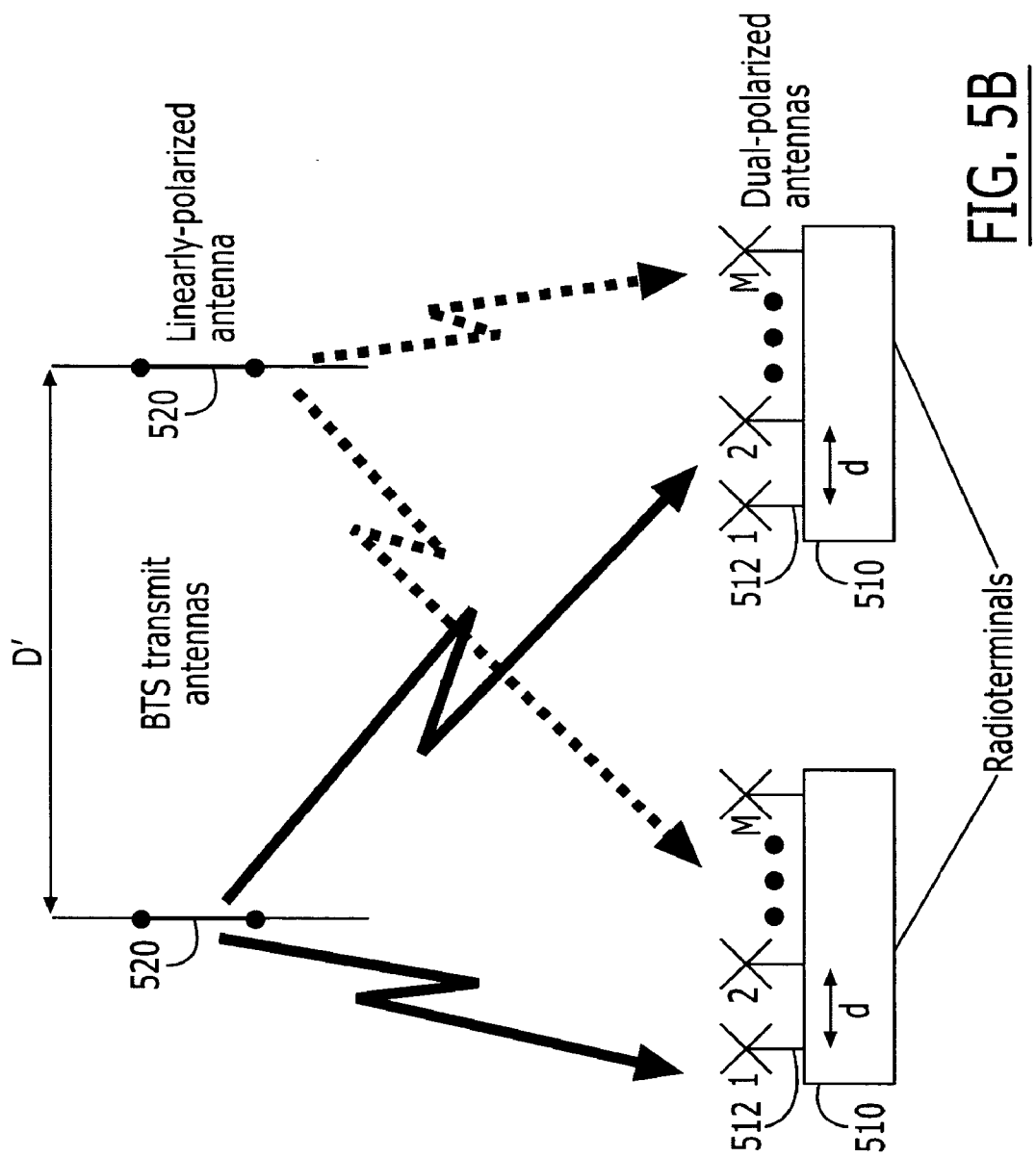
FIG. 5B is a diagram of base station to radioterminal communications according to embodiments of the present invention.

Additional discussion of co-channel wireless communications according to various embodiments of the invention now will be provided. Specifically, in accordance with "non-Time Division Duplex" (non-TDD) embodiments, the receiver of a radioterminal and the receiver of a BTS may be configured to operate on a plurality of signals that may be acquired via a plurality of spatially-separated and/or co-located antennas. The transmitter of a radioterminal may use a single antenna. The BTS may transmit the information that is intended for a first radioterminal from a first antenna and the information that is intended for a second radioterminal from a second antenna that may be spatially-separated from the first. The two radioterminals may use the same return-link channel resource(s) to transmit information to the BTS. The BTS may use the same forward-link channel resource(s) to transmit information to the two radioterminals. FIGS. 5A and 5B illustrate antenna configurations of non-TDD embodiments. It will also be understood that some embodiments of FIGS. 5A and 5B may be used in TDD mode as well.

Those skilled in the art will recognize that the M dual-polarized (or cross polarized) receiver antennas 512 of a radioterminal 510, as illustrated in FIG. 5B, may be replaced by M triple (x, y, z)-polarized, linearly-polarized, circularly-polarized and/or other type of receiver antennas. In some embodiments, only some of the M dual-polarized receiver antennas 512 of a radioterminal 510, as illustrated in FIG. 5B, may be replaced with triple-polarized, linearly-polarized, circularly-polarized, and/or other type of antennas, and that the value of M may be different for different radioterminals. In still other embodiments, only one receiver antenna that has been tapped at different points may be used on a radioterminal to provide a plurality of signal inputs to the radioterminal's receiver. It will also be understood by those of skill in the art that the N dual-polarized receiver antennas 540 of a BTS, as illustrated in FIG. 5A, may be replaced in part or in entirety by triple (x, y, z)-polarized, linearly-polarized, circularly-polarized, and/or other type of receiver antennas. Finally, those having skill in the art will also recognize that one or both of the linearly-polarized transmitter antennas 520 of a BTS, as illustrated in FIG. 5B, may be replaced by a dual- or multi-dimensionally-polarized, circularly-polarized and/or other type of transmitter antenna(s) and that the linearly-polarized transmitter antenna 532 of a radioterminal 530 may be replaced by a dual-polarized, multi-dimensionally-polarized, circularly-polarized and/or other type of transmitter antenna.

Those having skill in the art will also recognize that embodiments of FIGS. 5A and 5B may be extended to accommodate L co-channel radioterminals (L>2) by having L transmitter antennas 520 on the BTS with the $\lambda^{th}$ such antenna ($\lambda$=1, 2, . . . , L) transmitting information intended for a corresponding $\lambda^{th}$ radioterminal.

Figure 5C:
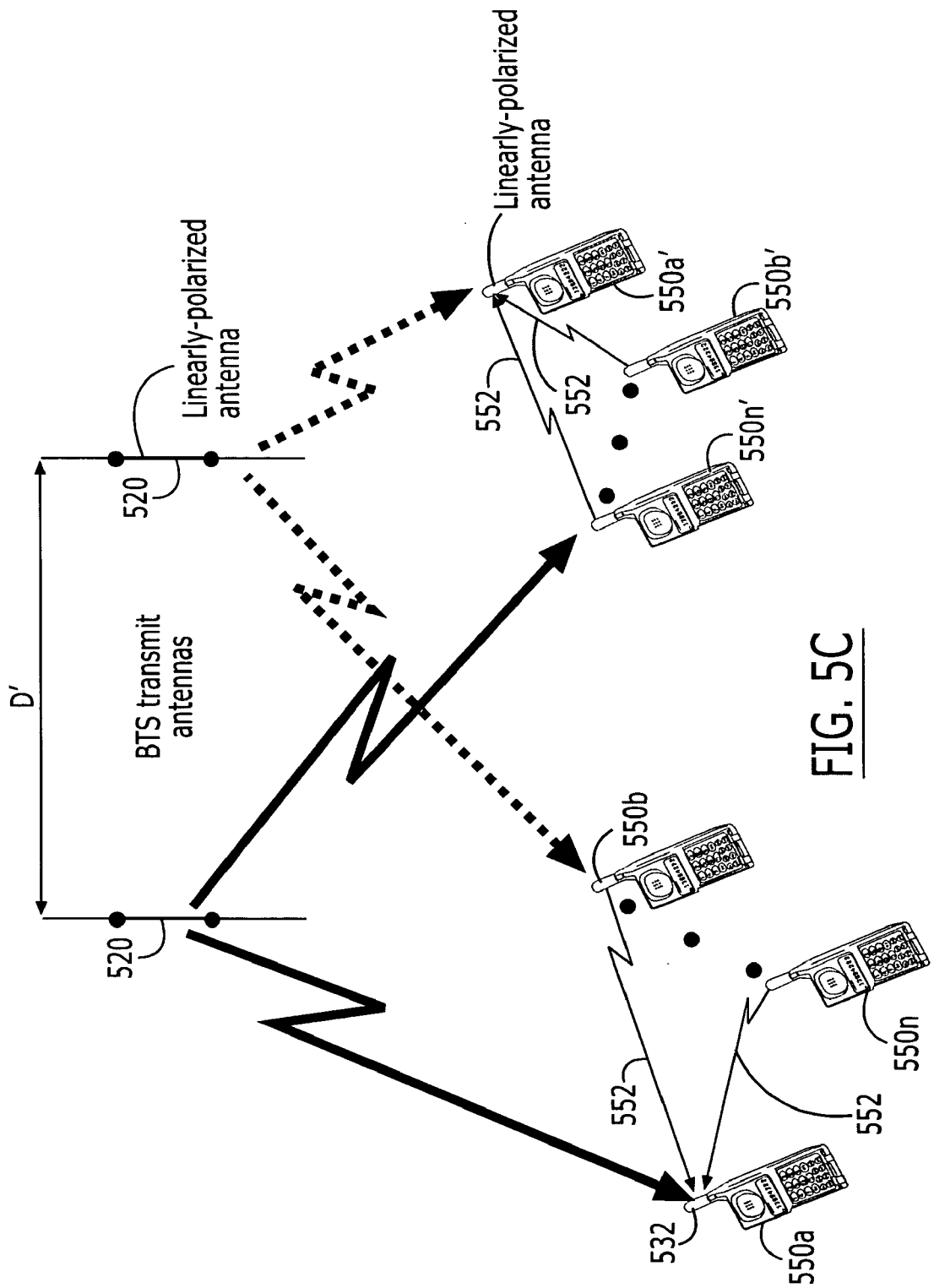
FIG. 5C is a diagram of base station to radioterminal communications according to other embodiments of the present invention.

Referring now to FIG. 5C, in environments of dense radioterminal communications, such as in airports, convention centers, shopping malls, etc., one or more radioterminals 550b-550n that is/are proximate to a first co-channel radioterminal 550a may be configured to provide signals to the first receiving co-channel radioterminal 550a. These signals may be relayed from the one or more proximate radioterminals 550b-550n to the first receiving co-channel radioterminal 550a via short-range wireless links 552. The first receiving co-channel radioterminal 550a may be configured to process the signals received from the one or more proximate radioterminals so as to improve a quality measure, such as the Bit Error Rate (BER), of the information that is being received from the BTS. Still referring to FIG. 5C, one or more radioterminals 550b'-550n' that is/are proximate to a second co-channel radioterminal 550a', may be configured to provide signals to the second receiving co-channel radioterminal 550a'. These signals may be relayed from the one or more proximate radioterminals 550b'-550n' to the second receiving co-channel radioterminal 550a' via short range wireless links 552. The second receiving co-channel radioterminal 550a' may be configured to process the signals received from the one or more proximate radioterminals, so as to improve a quality measure such as the BER of the information that is being received from the BTS. Accordingly, two or more radioterminals such as radioterminals 550a and 550a' may operate co-channel. It also will be understood that some embodiments of FIGS. 5C may be used in TDD mode as well.

Figure 6A:
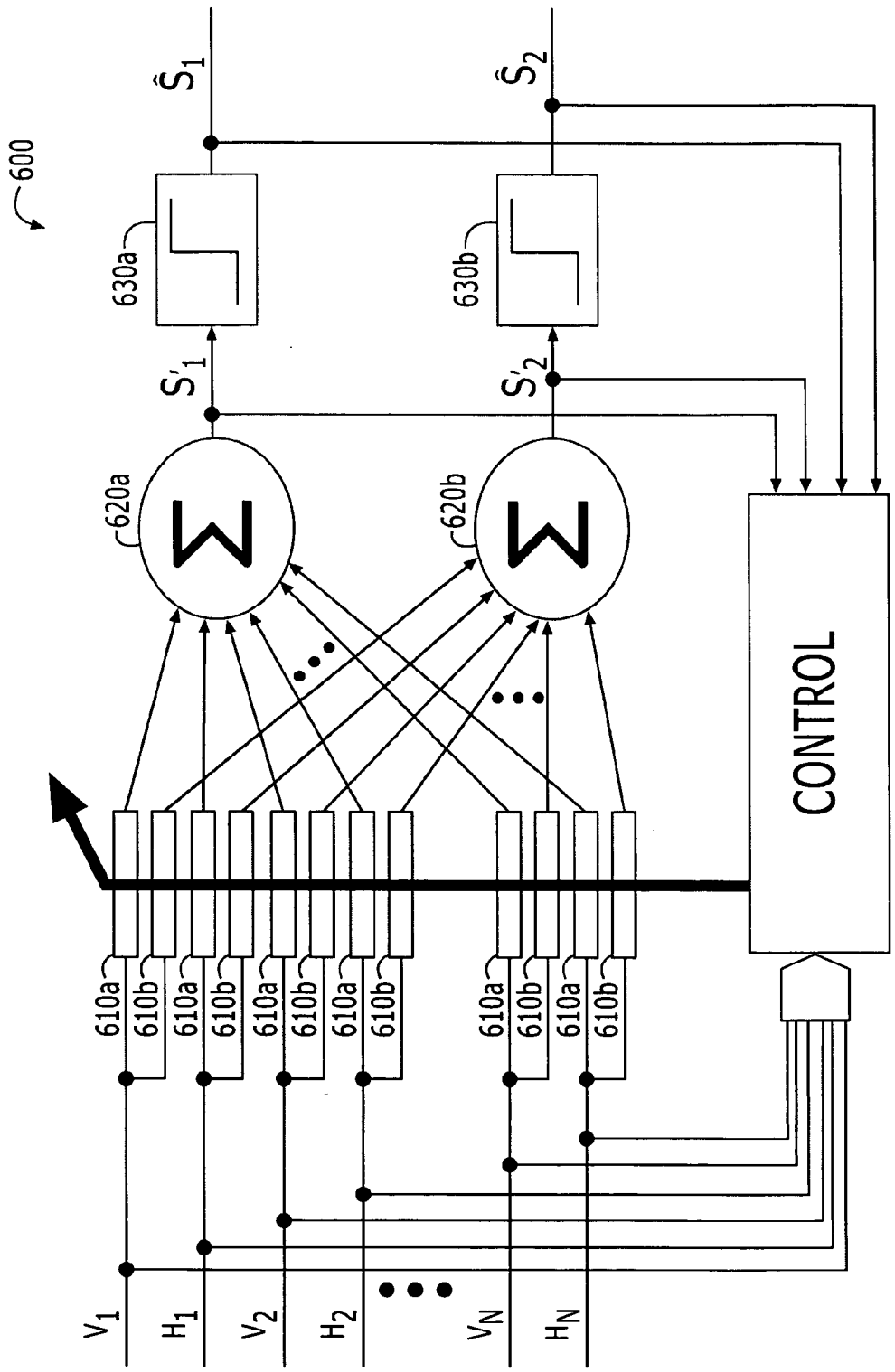
FIGS. 6A-6B are block diagrams of receivers that may be used in FIGS. 5A-5C according to embodiments of the present invention.

A linear receiver processor, in accordance with the well-known Least Mean Squared Error (LMSE) criterion, is illustrated in FIG. 6A for non-TDD embodiments. Those skilled in the art will recognize that other linear and/or non-linear receiver processors such as, for example, Kalman-based, least squares, recursive least squares, Zero Forcing (ZF) and/or Maximum Likelihood Sequence Estimation (MLSE) etc, may be used in lieu of and/or in combination with the receiver processor of FIG. 6A. It also will be understood that FIG. 6A illustrates a receiver for a BTS, but the principles and architecture may also be applied to a radioterminal.

In accordance with the illustrative BTS receiver antenna array 540 of FIG. 5A, each antenna of the array 540 operates in two spatial dimensions and provides two signals to the receiver: one corresponding to the first spatial dimension "vertically-polarized" and the other corresponding to the second spatial dimension "horizontally-polarized." Thus, in accordance with the receiver antenna array that is illustrated in FIG. 5A, the $i^{th}$ antenna (i=1, 2, . . . , N) provides the receiver with the signal inputs $V_i$ and $H_i$. As is illustrated in FIG. 6A, each signal of the set $\{V_1, H_1, V_2, H_2, \ldots, V_N, H_N\}$ is operated on by two transversal filters 610a, 610b; one for each co-channel source (radioterminal). The transversal filter outputs are summed at 620a, 620b, to produce an output signal S'j (j=1, 2) based on which a decision is made at Blocks 630a, 630b regarding the information symbol that has been transmitted by the $j^{th}$ co-channel source. The transversal filters may be fractionally spaced, synchronously spaced, or single tap filters.

Figure 7:
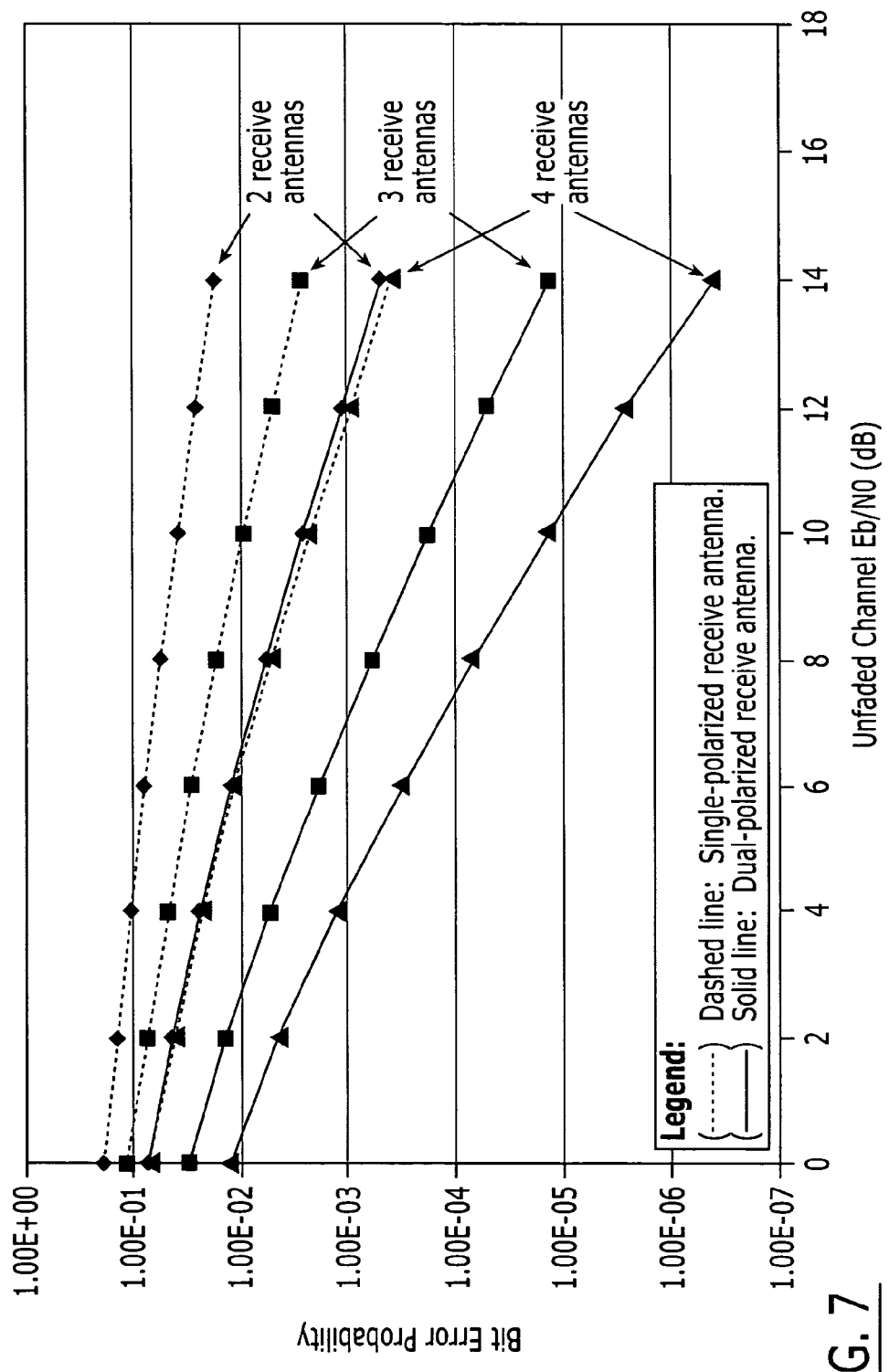
FIG. 7 graphically illustrates simulated receiver performance for signals in Rayleigh fading channels according to some embodiments of the present invention.

A computer simulation has been developed to assess the potential efficacy of the receiver of FIG. 6A. FIG. 7 graphically illustrates results of the computer simulation. The simulation modeled two co-channel radioterminals each transmitting independent data using Binary Phase Shift Keyed (BPSK) modulation with no Forward Error Correction (FEC) coding. The computer simulation modeled bursty transmission to emulate GSM. Within each burst of data, the channel was assumed static and an a priori known to the receiver training sequence (the burst mid-amble in GSM terminology) was used to estimate the transversal filter coefficients of the receiver. For each burst of data a new Rayleigh fading channel was picked pseudo-randomly. Flat Rayleigh-fading channels were assumed. Consequently, there was no Inter-Symbol Interference (ISI), only non-dispersive Co-channel Interference (CCI) due to the co-channel radioterminal. Thus, the receiver transversal filters reduced to single coefficient devices. The Bit Error Rate (BER) was evaluated for several receiver antenna configurations as described below.

As shown in FIG. 7, for the case of four dual-polarized receiver antennas, the uncoded Rayleigh-faded channel BER for each co-channel radioterminal, at $E_b/N_0$ of 4 dB, is $\sim 10^{-3}$, whereas the BER of classical BPSK in Additive White Gaussian Noise (AWGN) with no fading, at the same $E_b/N_0$ of 4 dB is $\sim 10-2$. Thus, the simulations appear to show that not only has the receiver of FIG. 6A reduced the CCI, but significant diversity gain has also been attained.

Figure 6B:
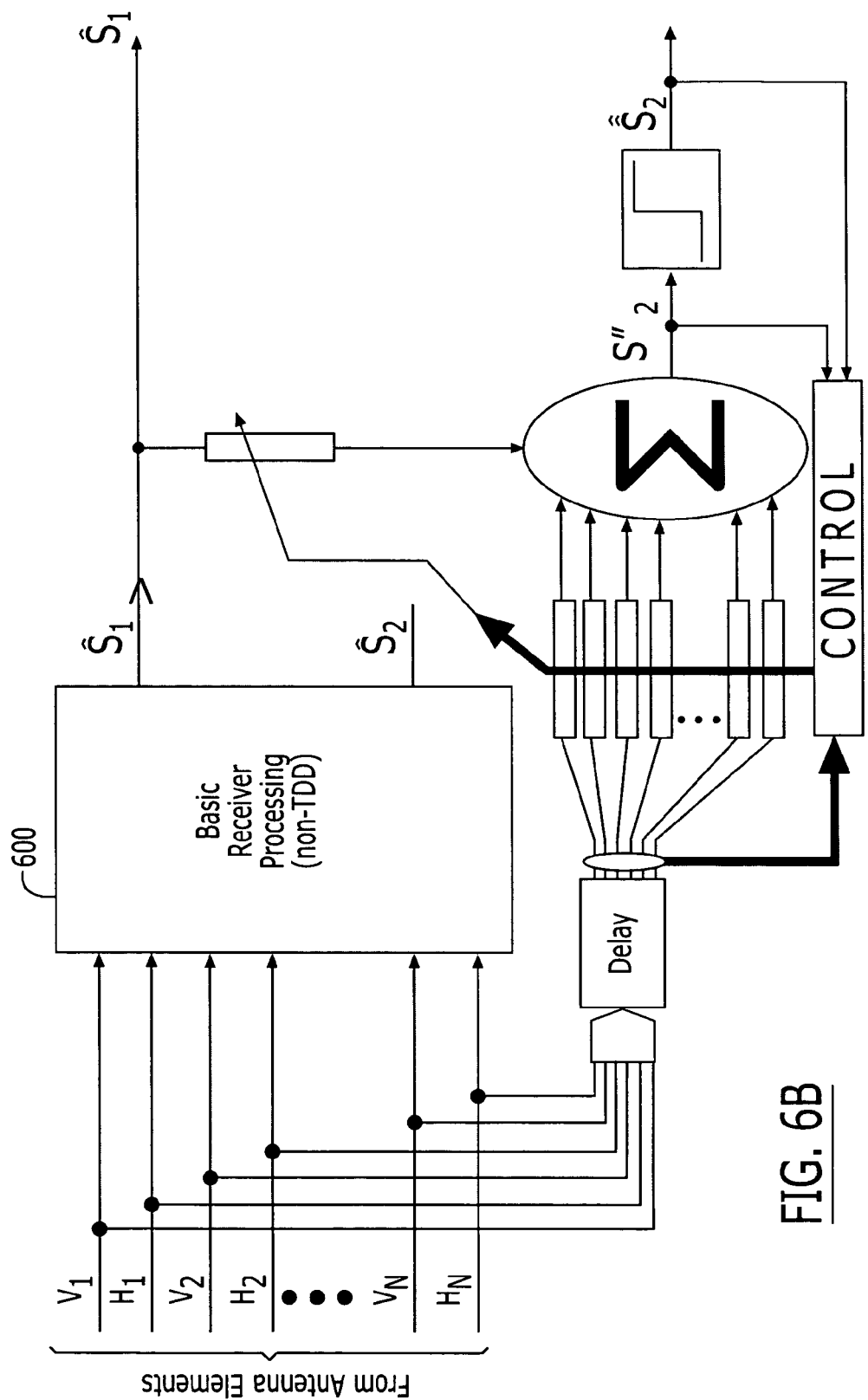

To potentially improve further on the receiver performance of FIG. 6A, a receiver architecture of FIG. 6B may be used. The receiver of FIG. 6B uses an estimate of the co-channel signal that has minimum noise and/or interference variance to cancel the CCI in the other co-channel signal, thus reducing or minimizing noise enhancement in the other co-channel signal, since a regenerated noise-free estimate of the CCI may now be used in the cancellation. Referring again to FIG. 6A, the noise and/or interference variance of the two co-channel decision variables $S'_1$ and $S'_2$ may be estimated once per "data burst." The duration of the data burst may be chosen small relative to the rate-of-change of the channel state so as to validate a static (or quasi-static) channel assumption over a given data burst. The estimate of noise and/or interference variance of $S'_j$ (j=1, 2) may, for example, be based on the magnitude of a linear superposition of squared transversal filter weights, that may be involved in forming $S'_j$ or may be based on processing of an a priori known to the receiver, training sequence. In the illustrative example of FIG. 6B, the noise and/or interference variance of $S'_1$ has been found to be smaller than the noise and/or interference variance of the second decision variable, $S'_2$. Thus, the decision that is made on $S'_1$, assumed correct, may be used to form an improved decision variable $S''_2$, based on which a decision or a series of decisions may be made regarding the data elements transmitted by the second co-channel radioterminal.

It will be understood by those of skill in the art that, in the illustrative receiver processing of FIG. 6B, if the second decision variable was found to have lower noise and/or interference variance, a decision on that variable may have been made and that decision may have been used to form an improved first decision variable. It will also be understood by those skilled in the art that the principle and receiver architecture that is illustrated on FIG. 6B, of first deciding on the least noise and/or interference variance variable and then using that decision to improve the noise and/or interference variance of the second decision variable, may be extended similarly to the general case where there are L co-channel radioterminals and, therefore, L decision variables at the receiver. In that case, the one (out of the L) decision variable with minimum noise and/or interference variance will be identified, a decision on it will be made, and that decision will be used to improve the noise and/or interference variance of the second least noise and/or interference variance variable. Then, a decision on the improved second least noise and/or interference variance variable will be made and now both decisions that have been made thus far can be used to improve the decision variable of the third least noise and/or interference variance variable, etc. Finally, it will be understood that even though the receiver principles and architectures of FIGS. 6A and 6B have been described using nomenclature associated with a BTS, the principles and receiver architectures of FIGS. 6A and 6B, and variations thereof, are also applicable to the radioterminal.

Figure 8:
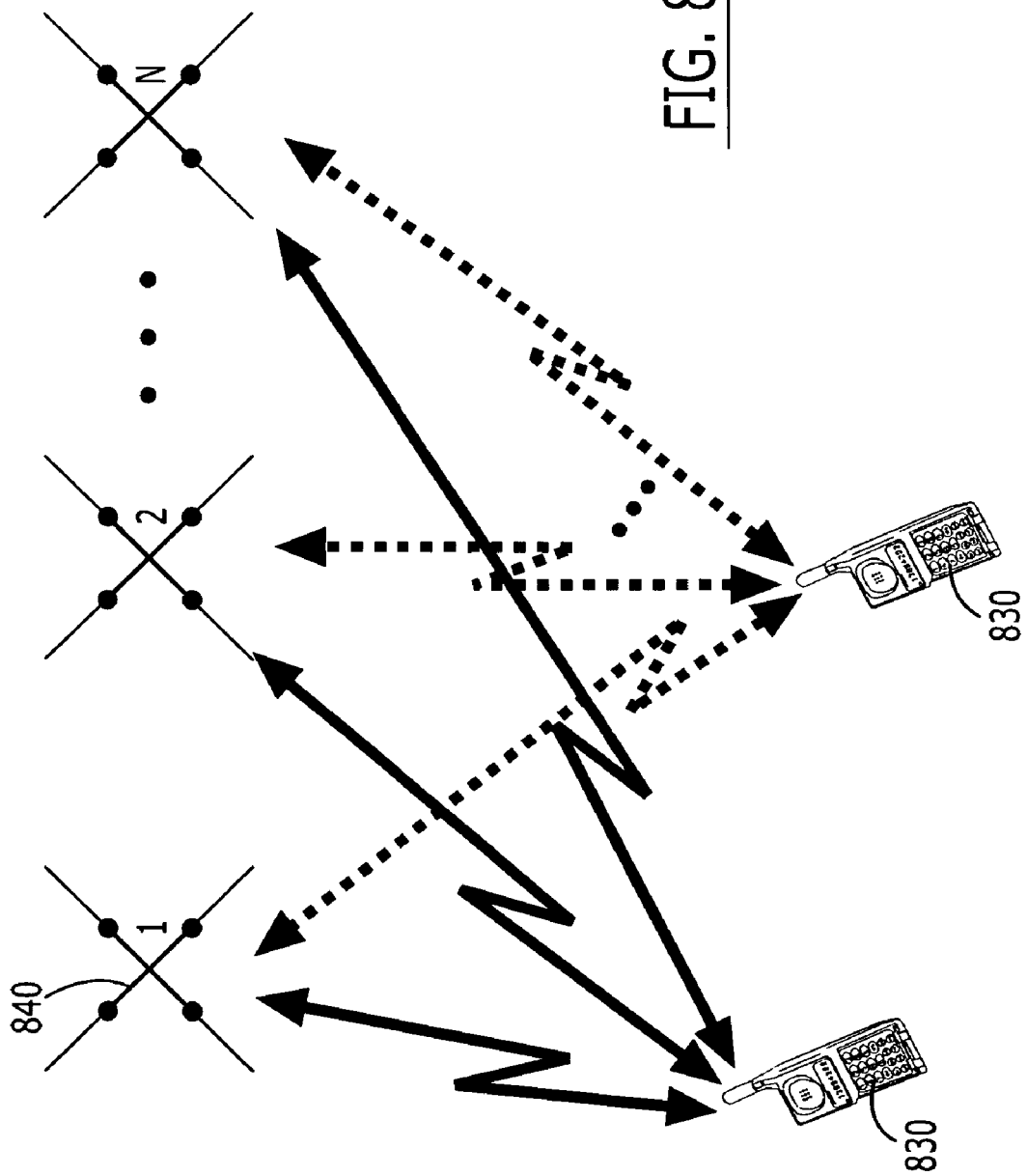
FIG. 8 is a diagram of base station to radioterminal bidirectional communications according to embodiments of the present invention.

FIG. 8 illustrates two radioterminals communicating co-channel bidirectionally with a BTS in a TDD mode according to other embodiments of the present invention. When the radioterminals 830 transmit information to the BTS antennas 840, a BTS receiver of FIGS. 6A and/or 6B may be used to process the received waveforms, as was already described, and make decisions on the data that has been transmitted co-channel to the BTS antennas 840 by the radioterminals 830. This function is illustrated by Block 910 of FIG. 9. The BTS receiver of FIG. 9 may also be configured to perform processing of the received waveforms in accordance with the well-known zero-forcing criterion thereby "forcing to zero", to the extent that digital quantization effects and/or other implementation constraints may allow, the ISI and the CCI, at least over the span of the transversal filters used. This function is illustrated by Block 920 of FIG. 9 and is further illustrated in greater detail in FIG. 10.

Figure 11:
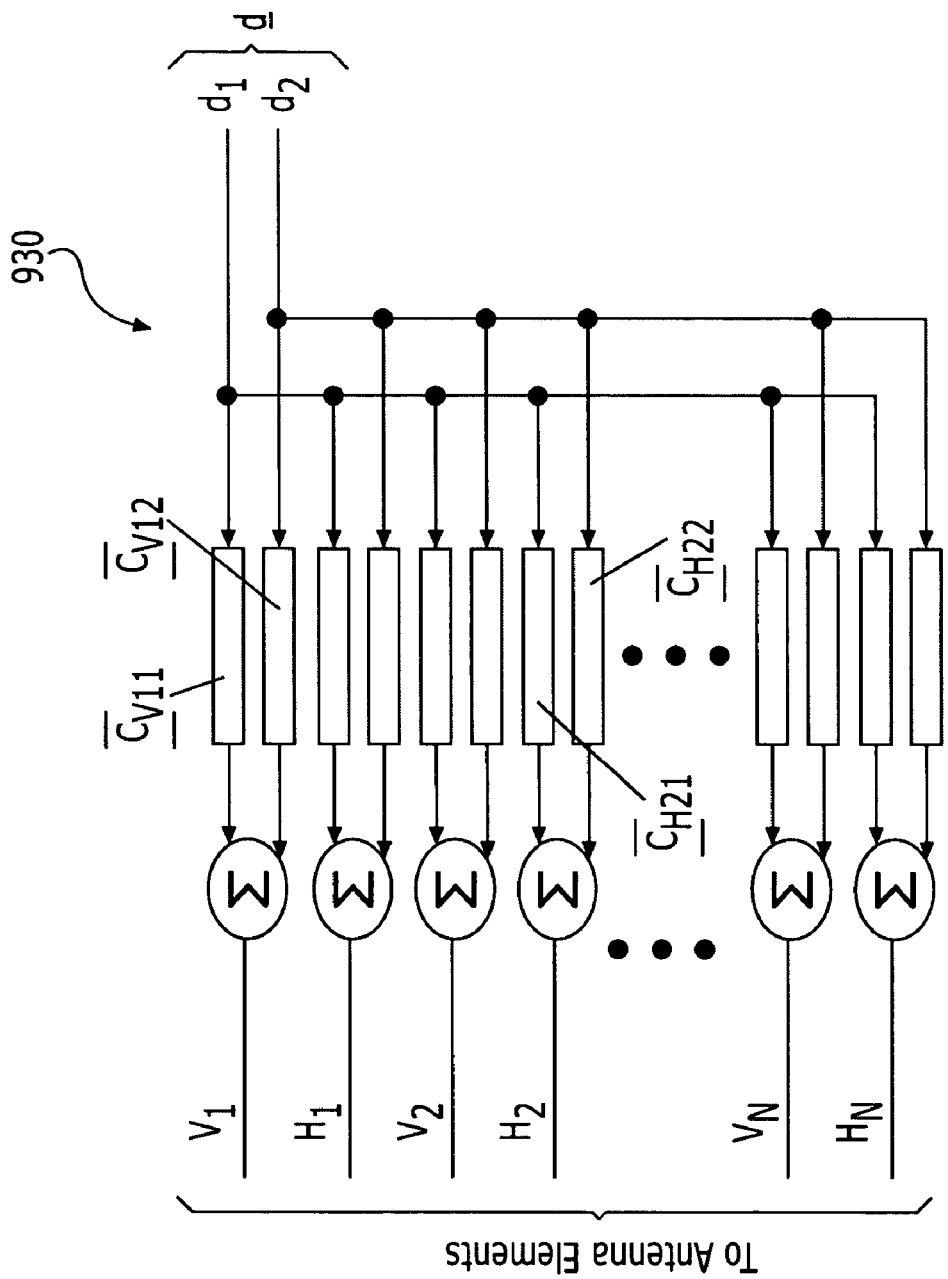
FIG. 11 is a block diagram of a transmitter that may be used in FIG. 9 according to embodiments of the present invention.

Over the time interval of a TDD frame, the state of the channel may be assumed static or quasi-static provided that the TDD frame interval has been chosen sufficiently small. Thus, capitalizing on the reciprocity of the TDD channel over its static or quasi-static interval the transversal filter coefficients that have been derived by the BTS receiver to yield "zero" ISI and CCI at the BTS, may be used to process or pre-distort a BTS data vector d prior to transmitting it to the co-channel radioterminals. In TDD, the same BTS antenna array may be performing both receive and transmit functions. This function is illustrated by Block 930 of FIG. 9 and is further illustrated in greater detail in FIG. 11. It also will be understood that some embodiments of FIG. 8 may be used in non-TDD mode, as well.

Given the above, the information that is transmitted by a BTS, co-channel, for a plurality of radioterminals, can arrive at the plurality of co-channel radioterminals free, or substantially free, of ISI and CCI. Thus, the receiver complexity of a radioterminal may be reduced and the radioterminal may only be equipped with a single linearly-polarized receiver antenna.

Figure 9:
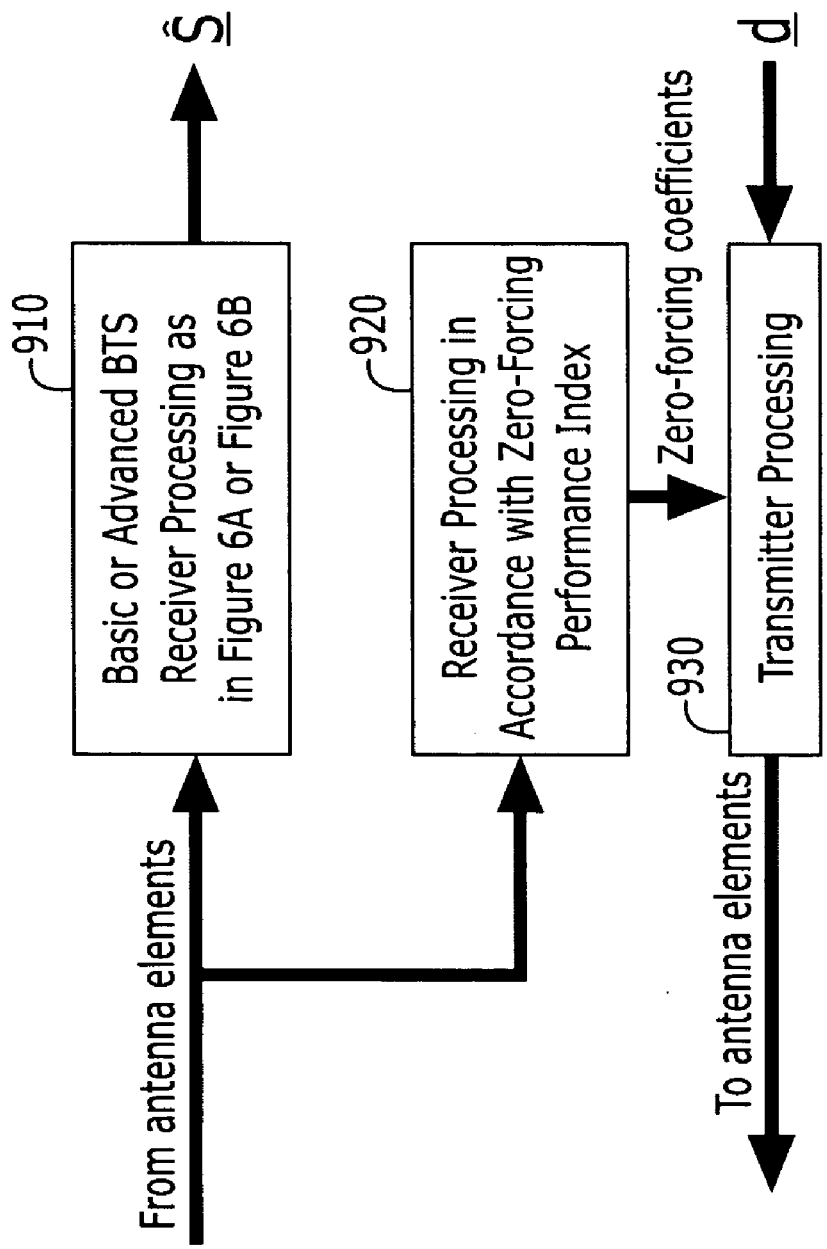
FIG. 9 is a block diagram of a receiver and transmitter that may be used in embodiments of FIG. 8.
Figure 10:
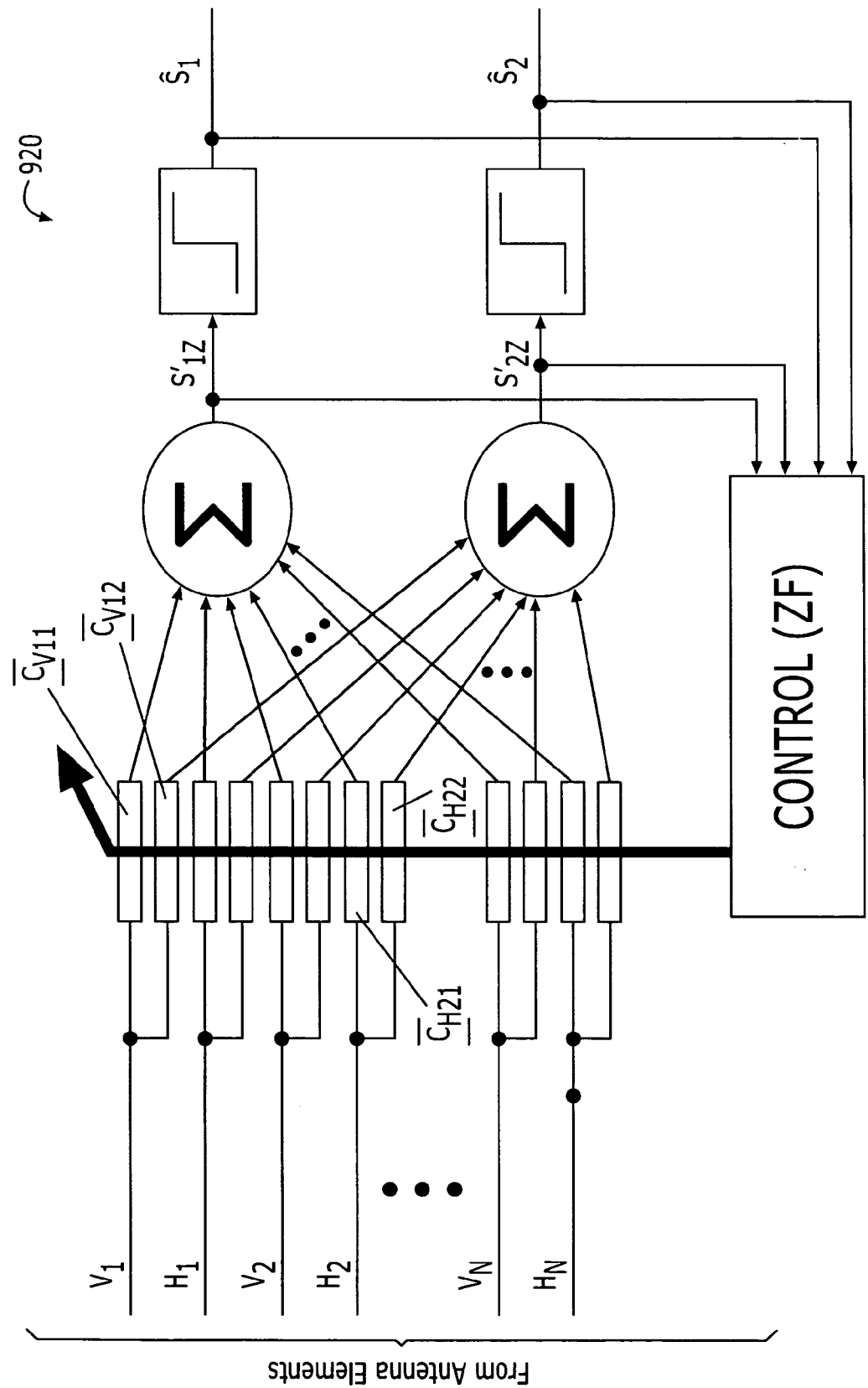
FIG. 10 is a block diagram of a receiver that may be used in FIG. 9 according to embodiments of the present invention.

Those skilled in the art will recognize that even in TDD mode the principles and receiver architectures that were described earlier for the non-TDD case can apply for both a BTS and a radioterminal. Also, those skilled in the art will recognize that the zero-forcing processing at a BTS receiver as illustrated in FIGS. 9 and 10 may be omitted and instead, the transversal filter coefficients derived from a LMSE processor (Block 910 of FIG. 9) may be used for the transmitter processing (Block 930 of FIG. 9) of a BTS. Accordingly, information that is received when wirelessly receiving at least two signals on the same carrier frequency, time interval, and/or code, from a corresponding at least two radioterminals, may be discriminated among the at least two signals.

Figure 12:
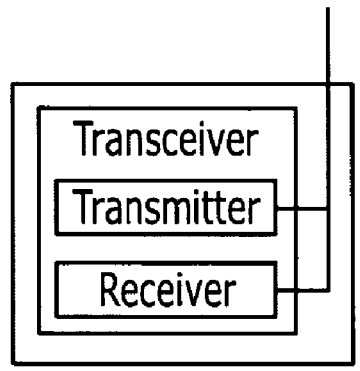
FIGS. 12 and 13 are diagrams of radioterminals and base stations, respectively, according to embodiments of the present invention.
Figure 13:
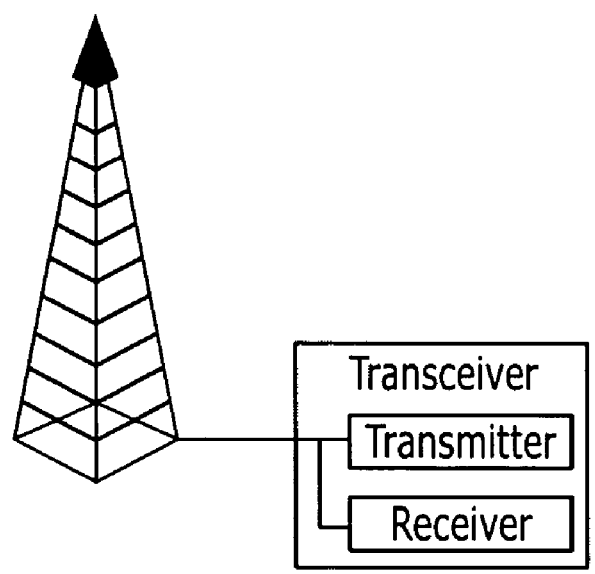

Finally, it will be understood that, in all of the embodiments that have been described herein, a radioterminal may include a transceiver which itself includes a transmitter and a receiver, as illustrated in FIG. 12, which perform the transmitting and receiving operations, respectively, that were described herein. The antenna of the radioterminal may be regarded as a component of the transceiver. Similarly, in all of the embodiments described herein, a base station may also include a transceiver which itself includes a transmitter and a receiver, as illustrated in FIG. 13, which perform the transmitting and receiving operations, respectively, that were described herein. The antenna of the base station may be regarded as a component of the transceiver.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless communication method comprising:
    receiving wireless communications from at least two radioterminals at a base station co-channel over a return link using a return link alphabet; and
    transmitting wireless communications from the base station to the at least two radioterminals over a forward link using a forward link alphabet that has more symbols than the return link alphabet.

2. A method according to claim 1 wherein transmitting wireless communications from the base station to the at least two radioterminals comprises:
    transmitting wireless communications from the base station to the at least two radioterminals non-co-channel over a forward link using a forward link alphabet that has more symbols than the return link alphabet.

3. A method according to claim 1 wherein receiving wireless communications from at least two radioterminals at a base station comprises:
    receiving wireless communications from at least two radioterminals at at least one antenna at the base station co-channel over a return link using a return link alphabet.

4. A method according to claim 1 wherein receiving wireless communications from at least two radioterminals at a base station comprises:
    receiving wireless communications from at least two radioterminals at at least one multiple-polarized antenna at the base station co-channel over a return link using a return link alphabet.

5. A method according to claim 1 wherein receiving wireless communications from at least two radioterminals at a base station comprises:
    receiving wireless communications from at least two radioterminals at a plurality of multiple-polarized antennas at the base station co-channel over a return link using a return link alphabet.

6. A method according to claim 1 wherein the base station includes a plurality of sectors and wherein receiving wireless communications from at least two radioterminals at a base station comprises:
    receiving wireless communications from at least two radioterminals at a plurality of multiple-polarized antennas in a sector of the base station co-channel over a return link using a return link alphabet.

7. A method according to claim 6 wherein receiving wireless communications from at least two radioterminals at a plurality of multiple-polarized antennas in a sector of the base station co-channel over a return link using a return link alphabet comprises:
    selectively receiving wireless communications from at least two radioterminals at a plurality of multiple-polarized antennas in a sector of the base station co-channel over a return link using a return link alphabet if the at least two radioterminals are separated by more than a predetermined distance.

8. A method according to claim 1 wherein the base station includes a plurality of sectors and wherein receiving wireless communications from at least two radioterminals at a base station comprises:
    receiving wireless communications from at least two radioterminals at at least one multiple-polarized antenna in at least two sectors of the base station co-channel over a return link using a return link alphabet.

9. A method according to claim 1 wherein the base station is a first base station and wherein receiving wireless communications from at least two radioterminals at a base station comprises:
    receiving wireless communications from at least two radioterminals at at least one multiple-polarized antenna at the first base station and at least one multiple-polarized antenna at a second base station co-channel over a return link using a return link alphabet.

10. A method according to claim 1 wherein receiving wireless communications from at least two radioterminals at a base station comprises:
    receiving wireless communications from a single linearly-polarized antenna at each of the at least two radioterminals at a base station co-channel over a return link using a return link alphabet.

11. A method according to claim 1, wherein transmitting wireless communications from the base station to the at least two radioterminals comprises:
    transmitting wireless communications signals that overlap in time and space, and that use the same carrier frequency, the same time slot if the signals are Time Division Multiple Access (TDMA) signals, and the same spreading code if the signals are Code Division Multiple Access (CDMA) signals, such that the wireless communication signals collide at a receiver.

12. A method according to claim 1 further comprising:
    decoding the wireless communications that are received from the at least two radioterminals at the base station co-channel.

13. A method according to claim 12, wherein decoding comprises:
    receiving at least first and second co-channel signals at respective at least first and second antennas;

processing the at least first and second co-channel signals to derive first data that is associated with a first one of the at least two radioterminals; and using the first data to derive second data that is associated with a second one of the at least two radioterminals.

14. A method according to claim 13, wherein processing comprises:

deriving at least first and second decision variables;

associating with each one of the at least first and second decision variables a measure of noise and/or interference;

selecting at least one of the at least first and second decision variables responsive to at least one noise and/or interference content associated therewith;

making at least one first decision based upon the selected at least one decision variable; and using the at least one first decision to make a second decision.

15. A method according to claim 13, wherein processing comprises:

generating a delayed version of the at least first and second co-channel signals; and jointly processing the at least first and second co-channel signals and the delayed version of the at least first and second co-channel signals.

16. A method according to claim 15, wherein jointly processing comprises using a linear and/or non-linear processor.

17. A method according to claim 16, wherein the linear and/or non-linear processor comprises a Least Mean Squared Error (LMSE), Kalman-based, least squares, recursive least squares, Zero Forcing (ZF) and/or Maximum Likelihood Sequence Estimation (MLSE) processor.

18. A method according to claim 17, wherein jointly processing comprises cancelling Co-Channel Interference (CCI).

19. A wireless communication method comprising:

receiving wireless communications from at least two radioterminals at a base station over a return link using a return link alphabet; and transmitting wireless communications from the base station to the at least two radioterminals co-channel over a forward link using a forward link alphabet that has more symbols than the return link alphabet.

20. A method according to claim 19 wherein receiving wireless communications from at least two radioterminals at a base station comprises:

receiving wireless communications from at least two radioterminals at a base station co-channel over a return link using a return link alphabet.

21. A method according to claim 19 wherein transmitting wireless communications from the base station to the at least two radioterminals comprises:

transmitting wireless communications from the base station to at least one antenna at each of the at least two radioterminals co-channel over a forward link using a forward link alphabet that has more symbols than the return link alphabet.

22. A method according to claim 19 wherein transmitting wireless communications from the base station to the at least two radioterminals comprises:

transmitting wireless communications from the base station to at least one multiple-polarized antenna at each of the at least two radioterminals co-channel over a forward link using a forward link alphabet that has more symbols than the return link alphabet.

23. A method according to claim 19 wherein transmitting wireless communications from the base station to the at least two radioterminals comprises:

transmitting wireless communications from the base station to a plurality of multiple-polarized antennas at each of the at least two radioterminals co-channel over a forward link using a forward link alphabet that has more symbols than the return link alphabet.

24. A method according to claim 19 wherein transmitting wireless communications from the base station to the at least two radioterminals comprises:

transmitting wireless communications from at least one antenna at the base station to the at least two radioterminals co-channel over a forward link using a forward link alphabet that has more symbols than the return link alphabet.

25. A method according to claim 19 wherein transmitting wireless communications from the base station to the at least two radioterminals comprises:

transmitting wireless communications from at least one linearly-polarized antenna at the base station to the at least two radioterminals co-channel over a forward link using a forward link alphabet that has more symbols than the return link alphabet.

26. A method according to claim 19 wherein transmitting wireless communications from the base station to the at least two radioterminals comprises:

transmitting wireless communications from at least two linearly-polarized antennas at the base station to the at least two radioterminals co-channel over a forward link using a forward link alphabet that has more symbols than the return link alphabet.

27. A method according to claim 19 wherein the base station includes a plurality of sectors and wherein transmitting wireless communications from at least two linearly-polarized antennas at the base station to the at least two radioterminals comprises:

transmitting wireless communications from at least two linearly-polarized antennas in a sector of the base station to the at least two radioterminals co-channel over a forward link using a forward link alphabet that has more symbols than the return link alphabet.

28. A method according to claim 19 wherein the base station includes a plurality of sectors and wherein transmitting wireless communications from at least two linearly-polarized antennas at the base station to the at least two radioterminals comprises:

transmitting wireless communications from at least one linearly-polarized antenna in at least two sectors of the base station to the at least two radioterminals co-channel over a forward link using a forward link alphabet that has more symbols than the return link alphabet.

29. A method according to claim 19 wherein the base station is a first base station and wherein transmitting wireless communications from the base station to the at least two radioterminals comprises:

transmitting wireless communications from at least one linearly-polarized antenna at the first base station and at least one linearly-polarized antenna at a second base station to the at least two radioterminals co-channel over a forward link using a forward link alphabet that has more symbols than the return link alphabet.

30. A method according to claim 19, wherein receiving wireless communications from at least two radioterminals at the base station comprises:

receiving wireless communications signals that overlap in time and space, and that use the same carrier frequency, the same time slot if the signals are Time Division Multiple Access (TDMA) signals, and the same spreading code if the signals are Code Division Multiple Access (CDMA) signals, such that the wireless communication signals collide at the base station.

31. A method according to claim 19 further comprising:
decoding the wireless communications that are transmitted from the base station to the at least two radioterminals co-channel.

32. A method according to claim 31, wherein decoding comprises:
receiving at least first and second co-channel signals at respective at least first and second antennas;
processing the at least first and second co-channel signals to derive first data that is associated with a first one of the at least two radioterminals; and
using the first data to derive second data that is associated with a second one of the at least two radioterminals.

33. A method according to claim 32, wherein processing comprises:
deriving at least first and second decision variables;
associating with each one of the at least first and second decision variables a measure of noise and/or interference;
selecting at least one of the at least first and second decision variables responsive to at least one noise and/or interference content associated therewith;
making at least one first decision based upon the selected at least one decision variable; and
using the at least one first decision to make a second decision.

34. A method according to claim 32, wherein processing comprises:
generating a delayed version of the at least first and second co-channel signals; and
jointly processing the at least first and second co-channel signals and the delayed version of the at least first and second co-channel signals.

35. A method according to claim 34, wherein jointly processing comprises using a linear and/or non-linear processor.

36. A method according to claim 35, wherein the linear and/or non-linear processor comprises a Least Mean Squared Error (LMSE), Kalman-based, least squares, recursive least squares, Zero Forcing (ZF) and/or Maximum Likelihood Sequence Estimation (MLSE) processor.

37. A method according to claim 36, wherein jointly processing comprises cancelling Co-Channel Interference (CCI).

38. A wireless communication method comprising:
receiving wireless communications co-channel in time division duplex from at least two radioterminals at a base station over a return link using a return link alphabet and transmitting wireless communications from the base station to the at least two radioterminals over a forward link using a forward link alphabet that has more symbols than the return link alphabet.

39. A method according to claim 38 wherein receiving wireless communications comprises:
receiving wireless communications co-channel in time division duplex from at least two radioterminals at at least one antenna at the base station over a return link using a return link alphabet and wherein transmitting wireless communications comprises transmitting wireless communications from the at least one antenna at the base station to the at least two radioterminals over a forward link using a forward link alphabet that has more symbols than the return link alphabet.

40. A method according to claim 38 wherein receiving wireless communications comprises:
receiving wireless communications co-channel in time division duplex from at least two radioterminals to at least one multiple-polarized antenna at the base station over a return link using a return link alphabet and wherein transmitting wireless communications comprises transmitting wireless communications from the at least one multiple-polarized antenna at the base station to the at least two radioterminals over a forward link using a forward link alphabet that has more symbols than the return link alphabet.

41. A method according to claim 38 wherein receiving wireless communications comprises:
receiving wireless communications co-channel in time division duplex from at least two radioterminals at a plurality of multiple-polarized antennas at the base station over a return link using a return link alphabet and wherein transmitting wireless communications comprises transmitting wireless communications from the plurality of multiple-polarized antennas at the base station to the at least two radioterminals over a forward link using a forward link alphabet that has more symbols than the return link alphabet.

42. A method according to claim 38 wherein the base station includes a plurality of sectors and wherein receiving wireless communications comprises:
receiving wireless communications co-channel in time division duplex from at least two radioterminals at a plurality of multiple-polarized antennas in a sector of the base station over a return link using a return link alphabet and wherein transmitting wireless communications comprises transmitting wireless communications from the plurality of multiple-polarized antennas in the sector of the base station to the at least two radioterminals over a forward link using a forward link alphabet that has more symbols than the return link alphabet.

43. A method according to claim 42 wherein receiving wireless communications co-channel in time division duplex from at least two radioterminals at a plurality of multiple-polarized antennas in a sector of the base station over a return link using a return link alphabet and transmitting wireless communications from the plurality of multiple-polarized antennas in the sector of the base station to the at least two radioterminals over a forward link using a forward link alphabet that has more symbols than the return link alphabet comprises:
selectively receiving wireless communications co-channel in time division duplex from at least two radioterminals at a plurality of multiple-polarized antennas in a sector of the base station over a return link using a return link alphabet and transmitting wireless communications from the plurality of multiple-polarized antennas in the sector of the base station to the at least two radioterminals over a forward link using a forward link alphabet that has more symbols than the return link alphabet if the at least two radioterminals are separated by more than a predetermined distance.

44. A method according to claim 38 wherein the base station includes a plurality of sectors and wherein receiving wireless communications comprises:
receiving wireless communications co-channel in time division duplex from at least two radioterminals at at least one multiple-polarized antenna in at least two sectors of the base station over a return link using a return link alphabet and wherein transmitting wireless communications comprises transmitting wireless communications from the at least one multiple-polarized antenna in the at least two sectors of the base station to the at least two radioterminals over a forward link using a forward link alphabet that has more symbols than the return link alphabet.

45. A method according to claim 38 wherein the base station is a first base station and wherein receiving wireless communications comprises:
receiving wireless communications co-channel in time division duplex from at least two radioterminals at at least one multiple-polarized antenna at the first base station and at least one multiple-polarized antenna at a second base station over a return link using a return link alphabet and wherein transmitting wireless communications comprises transmitting wireless communications from the at least one multiple-polarized antenna at the first base station and the at least one multiple-polarized antenna at the second base station to the at least two radioterminals over a forward link using a forward link alphabet that has more symbols than the return link alphabet.

46. A method according to claim 38 wherein receiving wireless communications comprises:
receiving wireless communications co-channel in time division duplex from a single linearly-polarized antenna at each of the at least two radioterminals at at least one antenna at the base station over a return link using a return link alphabet and wherein transmitting wireless communications comprises transmitting wireless communications from the at least one antenna at the base station to the single linearly-polarized antenna at each of the at least two radioterminals over a forward link using a forward link alphabet that has more symbols than the return link alphabet.

47. A method according to claim 38 wherein bidirectionally transmitting comprises:
bidirectionally transmitting wireless communications signals that overlap in time and space, and that use the same carrier frequency, the same time slot if the signals are Time Division Multiple Access (TDMA) signals, and the same spreading code if the signals are Code Division Multiple Access (CDMA) signals, such that the wireless communication signals collide at a receiver.

48. A method according to claim 38 further comprising:
decoding the wireless communications that are transmitted co-channel in time division duplex from the at least two radioterminals to the base station and from the base station to the at least two radioterminals.

49. A method according to claim 48, wherein decoding comprises:
receiving at least first and second co-channel signals at respective at least first and second antennas;
processing the at least first and second co-channel signals to derive first data that is associated with a first one of the at least two radioterminals; and
using the first data to derive second data that is associated with a second one of the at least two radioterminals.

50. A method according to claim 49, wherein processing comprises:
deriving at least first and second decision variables;
associating with each one of the at least first and second decision variables a measure of noise and/or interference;
selecting at least one of the at least first and second decision variables responsive to at least one noise and/or interference content associated therewith;
making at least one first decision based upon the selected at least one decision variable; and
using the at least one first decision to make a second decision.

51. A method according to claim 49, wherein processing comprises:
generating a delayed version of the at least first and second co-channel signals; and
jointly processing the at least first and second co-channel signals and the delayed version of the at least first and second co-channel signals.

52. A method according to claim 51, wherein jointly processing comprises using a linear and/or non-linear processor.

53. A method according to claim 52, wherein the linear and/or non-linear processor comprises a Least Mean Squared Error (LMSE), Kalman-based, least squares, recursive least squares, Zero Forcing (ZF) and/or Maximum Likelihood Sequence Estimation (MLSE) processor.

54. A method according to claim 53, wherein jointly processing comprises cancelling Co-Channel Interference (CCI).

55. A base station comprising:
a receiver that is configured to receive wireless communications from at least two radioterminals co-channel over a return link using a return link alphabet; and
a transmitter that is configured to transmit wireless communications to the at least two radioterminals over a forward link using a forward link alphabet that has more symbols than the return link alphabet.

56. A base station according to claim 55 wherein the transmitter is configured to transmit wireless communications to the at least two radioterminals non-co-channel over the forward link using a forward link alphabet that has more symbols than the return link alphabet.

57. A base station according to claim 55 wherein the receiver is configured to receive wireless communications from at least two radioterminals co-channel over a return link using a return link alphabet at at least one antenna.

58. A base station according to claim 55 wherein the receiver is configured to receive wireless communications from at least two radioterminals co-channel over a return link using a return link alphabet at at least one multiple-polarized antenna.

59. A base station according to claim 55 wherein the receiver is configured to receive wireless communications from at least two radioterminals co-channel over a return link using a return link alphabet at a plurality of multiple-polarized antennas.

60. A base station according to claim 55 wherein the base station includes a plurality of sectors and wherein the receiver is configured to receive wireless communications from at least two radioterminals co-channel over a return link using a return link alphabet at a plurality of multiple-polarized antennas in a sector of the base station.

61. A base station according to claim 55 wherein the base station includes a plurality of sectors and wherein the receiver is configured to receive wireless communications from at least two radioterminals co-channel over a return link using a return link alphabet at at least one multiple-polarized antenna in at least two sectors.

62. A base station according to claim 55, wherein the receiver is configured to receive wireless communication signals that overlap in time and space, and that use the same carrier frequency, the same time slot if the signals are Time Division Multiple Access (TDMA) signals, and the same spreading code if the signals are Code Division Multiple Access (CDMA) signals, such that the wireless communication signals collide at the receiver.

63. A base station according to claim 55 wherein the receiver is further configured to decode the wireless communications that are received from the at least two radioterminals co-channel.

64. A base station according to claim 63, wherein configured to decode comprises configured to:
receive at least first and second co-channel signals at respective at least first and second antennas;
process the at least first and second co-channel signals to derive first data that is associated with a first one of the at least two radioterminals; and
use the first data to derive second data that is associated with a second one of the at least two radioterminals.

65. A base station according to claim 64, wherein configured to process comprises configured to:
derive at least first and second decision variables;
associate with each one of the at least first and second decision variables a measure of noise and/or interference;
select at least one of the at least first and second decision variables responsive to at least one noise and/or interference content associated therewith;
make at least one first decision based upon the selected at least one decision variable; and
use the at least one first decision to make a second decision.

66. A base station according to claim 64, wherein configured to process comprises configured to:
generate a delayed version of the at least first and second co-channel signals; and
jointly process the at least first and second co-channel signals and the delayed version of the at least first and second co-channel signals.

67. A base station according to claim 66, wherein configured to jointly process comprises using a linear and/or non-linear processor.

68. A base station according to claim 67, wherein the linear and/or non-linear processor comprises a Least Mean Squared Error (LMSE), Kalman-based, least squares, recursive least squares, Zero Forcing (ZF) and/or Maximum Likelihood Sequence Estimation (MLSE) processor.

69. A base station according to claim 68, wherein configured to jointly process comprises configured to cancel Co-Channel Interference (CCI).

70. A base station comprising:
a receiver that is configured to receive wireless communications from at least two radioterminals over a return link using a return link alphabet; and
a transmitter that is configured to transmit wireless communications to the at least two radioterminals co-channel over a forward link using a forward link alphabet that has more symbols than the return link alphabet.

71. A base station according to claim 70 wherein the receiver is configured to receive wireless communications from at least two radioterminals co-channel over a return link using a return link alphabet.

72. A base station according to claim 70 wherein the transmitter is configured to transmit wireless communications to the at least two radioterminals co-channel over a forward link using a forward link alphabet that has more symbols than the return link alphabet at at least one antenna.

73. A base station according to claim 70 wherein the transmitter is configured to transmit wireless communications to the at least two radioterminals co-channel over a forward link using a forward link alphabet that has more symbols than the return link alphabet at at least one linearly-polarized antenna.

74. A base station according to claim 70 wherein the transmitter is configured to transmit wireless communications to the at least two radioterminals co-channel over a forward link using a forward link alphabet that has more symbols than the return link alphabet at at least two linearly-polarized antennas.

75. A base station according to claim 70 wherein the base station includes a plurality of sectors and wherein the transmitter is configured to transmit wireless communications to the at least two radioterminals co-channel over a forward link using a forward link alphabet that has more symbols than the return link alphabet at at least two linearly-polarized antennas in a sector.

76. A base station according to claim 70 wherein the base station includes a plurality of sectors and wherein the transmitter is configured to transmit wireless communications to the at least two radioterminals co-channel over a forward link using a forward link alphabet that has more symbols than the return link alphabet at at least one linearly-polarized antenna in at least two sectors.

77. A base station according to claim 70, wherein the transmitter is configured to transmit wireless communication signals that overlap in time and space, and that use the same carrier frequency, the same time slot if the signals are Time Division Multiple Access (TDMA) signals, and the same spreading code if the signals are Code Division Multiple Access (CDMA) signals. such that the wireless communication signals collide at a receiver.

78. A base station according to claim 70, wherein the receiver comprises:
at least first and second antennas that are configured to receive respective at least first and second co-channel signals; and
a processor that is configured to process the at least first and second co-channel signals to derive first data that is associated with a first one of the at least two radioterminals and to use the first data to derive second data that is associated with a second one of the at least two radioterminals.

79. A base station according to claim 78, wherein the processor is further configured to:
derive at least first and second decision variables;
associate with each one of the at least first and second decision variables a measure of noise and/or interference;
select at least one of the at least first and second decision variables responsive to at least one noise and/or interference content associated therewith;
make at least one first decision based upon the selected at least one decision variable; and
use the at least one first decision to make a second decision.

80. A base station according to claim 78, wherein the processor is further configured to:
generate a delayed version of the at least first and second co-channel signals; and
jointly process the at least first and second co-channel signals and the delayed version of the at least first and second co-channel signals.

81. A base station according to claim 80, wherein configured to jointly process comprises using a linear and/or non-linear processor.

82. A base station according to claim 81, wherein the linear and/or non-linear processor comprises a Least Mean Squared Error (LMSE), Kalman-based, least squares, recursive least squares, Zero Forcing (ZF) and/or Maximum Likelihood Sequence Estimation (MLSE) processor.

83. A base station according to claim 82, wherein configured to jointly process comprises configured to cancel Co-Channel Interference (CCI).

84. A base station comprising:
a time division duplex transceiver that is configured to receive wireless communications co-channel from at least two radioterminals over a return link using a return link alphabet and to transmit wireless communications to the at least two radioterminals over a forward link using a forward link alphabet that has more symbols than the return link alphabet.

85. A base station according to claim 84 wherein the transceiver is configured to receive wireless communications co-channel from at least two radioterminals over a return link using a return link alphabet and to transmit wireless communications to the at least two radioterminals over a forward link using a forward link alphabet that has more symbols than the return link alphabet at at least one antenna.

86. A base station according to claim 84 wherein the transceiver is configured to receive wireless communications co-channel from at least two radioterminals over a return link using a return link alphabet and to transmit wireless communications to the at least two radioterminals over a forward link using a forward link alphabet that has more symbols than the return link alphabet at at least one multiple-polarized antenna.

87. A base station according to claim 84 wherein the transceiver is configured to receive wireless communications co-channel from at least two radioterminals over a return link using a return link alphabet and to transmit wireless communications to the at least two radioterminals over a forward link using a forward link alphabet that has more symbols than the return link alphabet at a plurality of multiple-polarized antennas.

88. A base station according to claim 84 wherein the base station includes a plurality of sectors and wherein the transceiver is configured to receive wireless communications co-channel from at least two radioterminals over a return link using a return link alphabet and to transmit wireless communications to the at least two radioterminals over a forward link using a forward link alphabet that has more symbols than the return link alphabet at a plurality of multiple-polarized antennas in a sector.

89. A base station according to claim 88 wherein the transceiver is configured to selectively receive wireless communications co-channel from at least two radioterminals to the plurality of multiple-polarized antennas in the sector over a return link using a return link alphabet if the at least two radioterminals are separated by more than a predetermined distance.

90. A base station according to claim 84 wherein the base station includes a plurality of sectors and wherein the transceiver is configured to receive wireless communications co-channel from at least two radioterminals over a return link using a return link alphabet and to transmit wireless communications to the at least two radioterminals over a forward link using a forward link alphabet that has more symbols than the return link alphabet at at least one multiple-polarized antenna in at least two sectors.

91. A base station according to claim 84, wherein the transceiver is configured to receive wireless communication signals that overlap in time and space, and that use the same carrier frequency, the same time slot if the signals are Time Division Multiple Access (TDMA) signals, and the same spreading code if the signals are Code Division Multiple Access (CDMA) signals, such that the wireless communication signals collide at the transceiver.

92. A base station according to claim 84 wherein the time division duplex transceiver is further configured to decode the wireless communications that are received co-channel from the at least two radioterminals.

93. A base station according to claim 92, wherein configured to decode comprises configured to:
receive at least first and second co-channel signals at respective at least first and second antennas;
process the at least first and second co-channel signals to derive first data that is associated with a first one of the at least two radioterminals; and
use the first data to derive second data that is associated with a second one of the at least two radioterminals.

94. A base station according to claim 93, wherein configured to process comprises configured to:
derive at least first and second decision variables;
associate with each one of the at least first and second decision variables a measure of noise and/or interference;
select at least one of the at least first and second decision variables responsive to at least one noise and/or interference content associated therewith;
make at least one first decision based upon the selected at least one decision variable; and
use the at least one first decision to make a second decision.

95. A base station according to claim 93, wherein configured to process comprises configured to:
generate a delayed version of the at least first and second co-channel signals; and
jointly process the at least first and second co-channel signals and the delayed version of the at least first and second co-channel signals.

96. A base station according to claim 95, wherein configured to jointly process comprises using a linear and/or non-linear processor.

97. A base station according to claim 96, wherein the linear and/or non-linear processor comprises a Least Mean Squared Error (LMSE), Kalman-based, least squares, recursive least squares, Zero Forcing (ZF) and/or Maximum Likelihood Sequence Estimation (MLSE) processor.

98. A base station according to claim 97, wherein configured to jointly process comprises configured to cancel Co-Channel Interference (CCI).

\* \* \* \* \*